(12) United States Patent
Yamada et al.

(10) Patent No.: US 8,876,660 B2
(45) Date of Patent: Nov. 4, 2014

(54) VEHICLE CONTROLLER SYSTEM

(75) Inventors: Akiyoshi Yamada, Toyoake (JP);
Hiroshi Ueno, Toyota (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 326 days.

(21) Appl. No.: 13/496,975

(22) PCT Filed: Oct. 9, 2009

(86) PCT No.: PCT/JP2009/067650
§ 371 (c)(1),
(2), (4) Date: Mar. 19, 2012

(87) PCT Pub. No.: WO2011/042987
PCT Pub. Date: Apr. 14, 2011

(65) Prior Publication Data
US 2012/0190500 A1 Jul. 26, 2012

(51) Int. Cl.
| | |
|---|---|
| *B60W 10/04* | (2006.01) |
| *B60W 10/18* | (2012.01) |
| *B60T 8/00* | (2006.01) |
| *F02D 29/02* | (2006.01) |
| *B60T 8/32* | (2006.01) |
| *B60T 13/72* | (2006.01) |
| *B60T 13/68* | (2006.01) |
| *B60T 13/66* | (2006.01) |

(52) U.S. Cl.
CPC .............. *B60T 8/3275* (2013.01); *B60T 13/72* (2013.01); *B60T 13/686* (2013.01); *B60T 2201/03* (2013.01); *B60T 13/662* (2013.01); *F02D 29/02* (2013.01)
USPC .......................................... 477/185; 477/202

(58) Field of Classification Search
USPC .................. 477/184, 199, 202, 185
See application file for complete search history.

(56) References Cited

U.S. PATENT DOCUMENTS

| | | | | |
|---|---|---|---|---|
| 6,434,475 | B2 * | 8/2002 | Kaneko et al. | 477/205 |
| 6,540,644 | B2 * | 4/2003 | Morimoto et al. | 477/185 |
| 6,754,579 | B2 * | 6/2004 | Kamiya et al. | 477/203 |
| 2007/0054773 | A1 | 3/2007 | Braun et al. | |

FOREIGN PATENT DOCUMENTS

| | | |
|---|---|---|
| DE | 103 17 501 A1 | 11/2004 |
| JP | 2000 043692 | 2/2000 |
| JP | 2001 071878 | 3/2001 |
| JP | 2009 063001 | 3/2009 |

OTHER PUBLICATIONS

International Search Report issued on Jan. 12, 2010 in PCT/JP2009/067650 filed on Oct. 9, 2009.
International Preliminary Report on Patentability issued on Jan. 24, 2012 in PCT/JP2009/067650 filed on Oct. 9, 2009.

* cited by examiner

*Primary Examiner* — Jacob S Scott
(74) *Attorney, Agent, or Firm* — Oblon, Spivak, McClelland, Maier & Neustadt, L.L.P.

(57) ABSTRACT

A vehicle control system for a vehicle includes an engine control device configured to automatically stop an engine of the vehicle during running of the vehicle; and a brake control device configured to execute an assisting control for increasing an output of a brake for restraining rotation of a wheel of the vehicle when a starting condition for starting the assisting control is satisfied, such that an amount of the output increased by execution of the assisting control becomes larger than an amount corresponding to an operational state of a brake operating member of the vehicle. The brake control device includes an automatic-stop assisting control portion configured, during an automatic stop state in which the engine is automatically stopped by the engine control device, to execute the assisting control in a manner different from a manner in which the assisting control is executed during an activation state of the engine.

6 Claims, 10 Drawing Sheets

VEHICLE CONTROLLER SYSTEM

TECHNICAL FIELD

The present invention relates to a vehicle control system including an engine control device and a brake control device.

BACKGROUND ART

Patent Document 1 discloses an engine control device configured to automatically stop and start an engine of a vehicle during running of the vehicle. In the engine control device, when an operation velocity of a brake operating member is high, the automatic stop of the engine is inhibited. When deceleration of the vehicle is detected, a lockup clutch is placed in its ON state (connecting state) and a fuel supply is reduced (the automatic stop of the engine is made ready). However, when the operation velocity of the brake operating member is so high that the deceleration of the vehicle becomes high, namely, when there is a risk of engine stall, the engine stop is avoided.

Patent Document 2 discloses a brake control device in which an urgent-operation assisting control is executed to increase a hydraulic pressure in a brake cylinder when a condition for starting the assisting control is satisfied as a result of an urgent operation of a brake operating member. In this brake control device, the starting condition is regarded to be satisfied when a rate of increase of the hydraulic pressure in a master cylinder becomes not lower than a given rate $dP_{th}$ and the hydraulic pressure in the master cylinder becomes not lower than a given pressure $P_{th}$ within a given length of time.

PRIOR ART DOCUMENTS

Patent Documents

[Patent Literature 1] JP-2009-63001A
[Patent Literature 2] JP-2001-71878A

DISCLOSURE OF THE INVENTION

Object to be Achieved by the Invention

An object of the present invention is to make it possible to suitably execute an assisting control in a vehicle control system.

Measures for Achieving the Object and Effect

A vehicle control system described in claim 1 includes (a) an engine control device configured to automatically stop an engine of a vehicle during running of the vehicle and (b) a brake control device configured to execute an assisting control for increasing an output of a brake for restraining rotation of a wheel of the vehicle when a starting condition for starting the assisting control is satisfied, such that an amount of the output increased by execution of the assisting control becomes larger than an amount corresponding to an operational state of a brake operating member of the vehicle, by an assist amount, wherein the brake control device includes an automatic-stop assisting control portion is configured, during an automatic stop state in which the engine is being automatically stopped by the engine control device, to execute the assisting control in a manner different from a manner in which the assisting control is executed during an activation state of the engine.

In the vehicle control system described in this mode, the assisting control for assisting the brake is executed in a manner that varies depending on whether the automatic stop state or activation state of the engine is being established.

The feature that "the manner of the assisting control is different" corresponds to, for example, a case in which a content of the starting condition is different and a case in which the assist amount as such and a rule for determination of the assist amount are different.

(i) For example, there is a case in which the assisting control is started upon satisfaction of the starting condition when the increase rate dPm of the hydraulic pressure in a master cylinder exceeds a threshold value $dPm_{th}$, wherein the hydraulic pressure is what is generated in a pressurized chamber of the master cylinder such that the generated hydraulic pressure is dependent on an output of an operating force which is applied to a brake operating member and which is boosted by a vacuum booster (hereinafter simply referred to as "booster").

During the activation state of the engine, since a negative pressure can be supplied to a negative pressure chamber of the booster, a pressure in the negative pressure chamber (hereinafter simply referred to as "booster negative pressure") is estimated to be close to a vacuum pressure. During the automatic stop state of the engine, since the negative pressure is, in principle, not supplied to the negative pressure chamber of the booster, the booster negative pressure is estimated to be close to an atmospheric pressure.

FIG. 7 shows a change of the hydraulic pressure in the master cylinder in each of cases which are: a case in which an operation velocity (i.e., a rate of increase of the operating force) is high (for example, an urgent operation is carried out) with the booster negative pressure being close to the vacuum pressure; a case in which the operation velocity is high with the booster negative pressure being close to the atmospheric pressure; a case in which the operation velocity is low with the booster negative pressure being close to the vacuum pressure; and a case in which the operation velocity is low with the booster negative pressure being close to the atmospheric pressure. In FIG. 7, a thin solid line represents the hydraulic pressure change in the master cylinder in the case in which the operation velocity is low with the booster negative pressure being close to the vacuum pressure, a thin broken line represents the hydraulic pressure change in the master cylinder in the case in which the operation velocity is low with the booster negative pressure being close to the atmospheric pressure, a thick solid line represents the hydraulic pressure change in the master cylinder in the case in which the operation velocity is high with the booster negative pressure being close to the vacuum pressure, and a thick broken line represents the hydraulic pressure change in the master cylinder in the case in which the operation velocity is high with the booster negative pressure being close to the atmospheric pressure. Further, an axis of abscissa in FIG. 7 represents a time, so that FIG. 7 shows the hydraulic pressure change in the master cylinder when a vehicle operator operates the brake operating member with the rate of increase of the operating force being constant, in each of the above-described cases.

It is understood from FIG. 7 that, when the operation velocity is low, a delay of the increase of the master-cylinder hydraulic pressure with respect to the increase of the operating force is small irrespective of whether the booster negative pressure is close to the atmospheric pressure or the vacuum pressure. It is also understood from FIG. 7 that, when the operation velocity is high, the delay of the increase of the master-cylinder hydraulic pressure with respect to the increase of the operating force is increased, and the delay is further increased due to, for example, a delay of boosting by the booster if the booster negative pressure is close to the atmospheric pressure.

Therefore, even when substantially the same urgent operation (i.e., the operation with the operating force being increased at the same high rate) is carried out, the assisting control is executed by satisfaction of the starting condition during the activation state of the engine, but there is a case in which the assisting control is not executed due to unsatisfaction of the starting condition during the automatic stop state of the engine.

In view of this, for example, during the automatic stop state of the engine, the above-described threshold value $dPm_{th}$ regarding the increase rate dPm of the hydraulic pressure in the master cylinder may be set to a value ($dPm_{th}-\Delta$), so that the assisting control can be suitably executed even during the automatic stop state of the engine.

(ii) Further, as indicated by the thin solid line, thin broken line, thick solid line and thick broken line in FIG. 7, an outputable maximum boosting force (i.e., a boosting force generatable when the booster reaches a boosting limit) is smaller when the booster negative pressure is close to the atmospheric pressure than when the booster negative pressure is close to the vacuum pressure. Therefore, during the automatic stop state of the engine, there is a case where a sufficient braking force cannot be obtained, due to reduction of the hydraulic pressure in the master cylinder after the booster has reached the boosting limit. In view of this, for example, during the automatic stop state of the engine, the assist amount may be adapted to be larger than during the activation state of the engine, so that the insufficiency of the braking force can be avoided whereby the assisting control can be suitably executed even during the automatic stop state of the engine.

It is noted that, as shown in FIG. 7, even before the booster reaches the boosting limit, the master-cylinder hydraulic pressure is lower due to delay of boosting by the booster during the automatic stop state of the engine than during the activation state of the engine. In view of this, the brake response delay can be reduced by increasing the assist amount.

(iii) Further, during the automatic stop state of the engine, there is a case where an electric power (reserve of power) stored in a storage device such as battery or the like becomes insufficient, since a generator is also in it stop state. It is common that the electric power is consumed in execution of the assisting control. Therefore, it is desirable that, during the automatic stop state of the engine, the consumption of the electric power in execution of the assisting control is reduced. In view of this, for example, during the automatic stop state of the engine, the assisting control may be started at a stage earlier than during the activation state of the engine. If a need for execution of the assisting control can be eliminated rapidly by starting the assisting control at the earlier stage, an excessive consumption of the electric power can be avoided whereby the assisting control can be suitably executed.

As described above, by causing the assisting control to be executed in a manner that varies depending on whether the engine is being placed in the automatic stop state or activation state, it is possible to cause the assisting control to be suitably executed even during the automatic stop state of the engine.

CLAIMABLE INVENTION

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A vehicle control system for a vehicle, including:
an engine control device configured to automatically stop an engine of the vehicle during running of the vehicle; and
a brake control device configured to execute an assisting control for increasing an output of a brake for restraining rotation of a wheel of the vehicle when a starting condition for starting the assisting control is satisfied, such that an amount of the output increased by execution of the assisting control becomes larger than an amount corresponding to an operational state of a brake operating member of the vehicle, by an assist amount,
the vehicle control system being characterized in that:
the brake control device includes an automatic-stop assisting control portion is configured, during an automatic stop state in which the engine is being automatically stopped by the engine control device, to execute the assisting control in a manner different from a manner in which the assisting control is executed during an activation state of the engine.

The assisting control is a control for making the output of the brake larger than the amount corresponding to the operational state of the brake operating member of the vehicle, by the assist amount.

The "amount corresponding to the operational state of the brake operating member" may be interpreted to mean an amount of the hydraulic pressure in the master cylinder where the brake is a hydraulic brake that is to be activated by a hydraulic pressure in a master cylinder. The output of the brake corresponds to a required value determined depending on an operating amount of the brake operating member, where the output of the brake is, in a normal case (i.e., in a case in which the assisting control, anti-slipping control or the like is not being executed), is controlled to become close to the required value. The operating amount of the brake operating member corresponds to at least one of an operating force applied to the brake operating member, a stroke position of the brake operating member and the hydraulic pressure in the master cylinder.

The assist amount may be either a fixed amount or a variable amount. Where the assist amount is a variable amount, the assist amount may vary dependent on a degree of urgency. That is, for example, the assistant amount may be larger when a brake operation velocity is high than when the brake operation velocity is low, or may be larger when the vehicle is more likely to quickly become close to another vehicle preceding the vehicle in question, than when the vehicle is less likely to quickly become close to the preceding vehicle.

(2) The vehicle control system according to mode (1), wherein the automatic-stop assisting control portion includes a starting-condition determining portion configured to determine the starting condition that is to be satisfied during the automatic stop state of the engine, such that the determined starting condition during the automatic stop state is satisfiable easier than the starting condition during the activation state of the engine.

The "easier satisfiable condition" is a condition in which a threshold regarding a physical value (that may be also another physical value having one-to-one relationship with this physical value), which is used for determination as to whether the starting condition is being satisfied or not, is made relatively low. For example, where the starting condition during the activation state of the engine is satisfied when the increase rate of the master-cylinder hydraulic pressure exceeds a threshold, the "easier satisfiable condition" corresponds to a condition in which the threshold during the automatic stop state of the engine is made low. The condition in which the threshold is made low corresponds to the "easier satisfiable condition", in view of the increase rate of the master-cylinder hydraulic pressure.

However, in view of the operational state (e.g., an increase rate of the operating force) established by the vehicle operator, rather than the increase rate of the master-cylinder hydraulic pressure, this condition does not necessarily correspond to the condition which is satisfiable easier during the automatic stop state of the engine than during the activation state of the engine. As described above, when an urgent operation is carried out during the automatic stop state of the engine with the booster negative pressure being close to the atmospheric pressure, the delay of the increase of the master-cylinder hydraulic pressure is large. Therefore, even where the threshold during the automatic stop state of the engine is made low, there is a case in which the increase rate of the master-cylinder hydraulic pressure does not exceed the threshold or exceeds the threshold at a late point of time, when the urgent operation (which is the same as that is to be carried out during the activation state) is carried out during the automatic stop state.

On the other hand, in view of the operation stroke position of the brake operating member operated by the vehicle operator, the above-described condition is the easier satisfiable condition, because an increase rate of the operating amount of the brake operating member can be considered to have one-to-one relationship with the increase rate of the master-cylinder hydraulic pressure.

Thus, in the vehicle control described in this mode, the starting condition is satisfiable easier during the automatic stop state of the engine than during the activation state of the engine, owing to the content of the starting condition that relates to the physical value or the like.

(3) The vehicle control system according to mode (1) or (2), which is to be provided in the vehicle including (a) a vacuum booster configured to boost an operating force applied to the brake operating member, owing to a pressure difference between a negative pressure chamber and a variable pressure chamber of the vacuum booster, and configured to output the boosted operating force, (b) a master cylinder configured to cause a pressurizing piston of the master cylinder to be moved forwardly by the boosted operating force outputted by the vacuum booster, so as to generate a hydraulic pressure in a pressurized chamber located on a front side of the pressurizing piston, and (c) a negative-pressure supplying mechanism configured to supply a negative pressure to the negative chamber of the vacuum booster, owing to activation of the engine.

In FIG. 10, a solid line represents the hydraulic pressure change in the master cylinder in relation with increase of the operating force applied to the brake operating member in a case in which an urgent operation is carried out with the booster negative pressure being close to the vacuum pressure, while a broken line represents the hydraulic pressure change in the master cylinder in relation with increase of the operating force applied to the brake operating member in a case in which an urgent operation is carried out with the booster negative pressure being close to the atmospheric pressure. It is understood from FIG. 10 that a relationship between the operating force and the master-cylinder hydraulic pressure and a relationship between an increase rate of the operating force and an increase rate of the master-cylinder hydraulic pressure vary depending on whether the booster negative pressure is close to the atmospheric pressure or the vacuum pressure. Therefore, where the judgment as to whether the starting condition is satisfied or not, is made based on the hydraulic pressure in the master cylinder and the increase rate of the master-cylinder hydraulic pressure, it is appropriate that the starting condition is adapted to vary depending on whether the engine is being placed in the automatic stop state or the activation state.

Further, for the same reason, it is appropriate that a value of the assist amount and a rule for determining the value of the assist amount are adapted to vary depending on whether the engine is being placed in the automatic stop state or the activation state.

(4) The vehicle control system according to mode (3), wherein the brake control device includes an urgent-operation assisting control portion configured to regard that the starting condition is satisfied when at least one of a hydraulic-pressure-related value and an increase rate of the hydraulic-pressure-related value is larger than an urgent-operation judgment threshold regarding the at least one of the hydraulic-pressure-related value and the increase rate of the hydraulic-pressure-related value, and configured to start the assisting control when regarding that the starting condition is satisfied, the hydraulic-pressure-related value being constituted by at least one of the hydraulic pressure in the master cylinder and a physical value having one-to-one relationship with the hydraulic pressure in the master cylinder.

The above-described physical value having one-to-one relationship with the hydraulic pressure in the master cylinder may be constituted by, for example, the stroke position of the brake operating member, or the hydraulic pressure in the brake cylinder where the brake is a hydraulic brake that is to be activated by the hydraulic pressure in the master cylinder. The master-cylinder hydraulic pressure, the stroke position of the brake operating member, the hydraulic pressure in the brake cylinder and the like correspond to the above-described hydraulic-pressure-related value.

When the hydraulic-pressure-related value is larger than the urgent-operation judgment threshold regarding the hydraulic-pressure-related value and/or the increase rate of the hydraulic-pressure-related value is larger than the urgent-operation judgment threshold regarding the increase rate, it is judged that the urgent operation has been carried out, and then the urgent-operation assisting control is started.

It is noted that the urgent-operation assisting control may be started at least when the increase rate of the hydraulicpressure-related value is larger than the urgent-operation judgment threshold regarding the increase rate.
(5) The vehicle control system according to mode (4), wherein the starting-condition determining portion includes an urgent-operation judgment-threshold determining portion configured to determine the urgent-operation judgment threshold that is to be used during the automatic stop state of the engine such that the determined urgent-operation judgment threshold used during the automatic stop state is smaller than the urgent-operation judgment threshold used during the activation state of the engine.

From FIG. 7, it can be estimated that, when the urgent operation is carried out, the increase rate of the master-cylinder hydraulic pressure is relatively moderate during the automatic stop state of the engine due to the delay of boosting by the booster, as compared with that during the activation state of the engine. Therefore, the assisting control can be suitably started, by determining the urgent-operation judgment threshold regarding the increase rate of the master-cylinder hydraulic pressure such that the determined urgent-operation judgment threshold is smaller during the automatic stop state of the engine than during the activation state of the engine.

Further, just before the booster reaches the boosting limit, the hydraulic pressure in the master cylinder is relatively low during the automatic stop state of the engine due to the delay of boosting by the booster, as compared with that during the activation state of the engine. Therefore, the assisting control can be suitably started, by determining the urgent-operation judgment threshold regarding the master-cylinder hydraulic pressure such that the determined urgent-operation judgment threshold is smaller during the automatic stop state of the engine than during the activation state of the engine.

It is noted that the determined urgent-operation judgment threshold may be always made smaller during the automatic stop state of the engine than during the activation state of the engine, or may be made smaller as needed during the automatic stop state of the engine than during the activation state of the engine.
(6) The vehicle control system according to mode (5), wherein the urgent-operation judgment-threshold determining portion includes a fixed-threshold determining portion configured to determine a predetermined fixed value as the urgent-operation judgment threshold that is to be used during the automatic stop state of the engine.

There are (a) a case in which the urgent-operation judgment threshold used during the activation state of the engine is constituted by a fixed value and (b) a case in which the urgent-operation judgment threshold used during the activation state of the engine is constituted by a variable value. In the latter case, the urgent-operation judgment threshold may be a value determined based on, for example, the booster negative pressure.

The urgent-operation judgment threshold used during the automatic stop state of the engine may be constituted by (a) a fixed value ($X-\Delta$) that is smaller than a fixed value X where the urgent-operation judgment threshold used during the activation state of the engine is constituted by this fixed value X or (b) a fixed value ($AXs-\Delta$) that is smaller than a lower limit AXs of a variable value AX where the urgent-operation judgment threshold used during the activation state is constituted by this variable value AX.
(7) The vehicle control system according to mode (5) or (6), wherein the urgent-operation judgment-threshold determining portion includes a variable-threshold determining portion configured to determine a variable value as the urgent-operation judgment threshold that is to be used during the automatic stop state of the engine, such that the determined urgent-operation judgment threshold used during the automatic stop state is smaller when a pressure in the negative pressure chamber of the vacuum booster is close to an atmospheric pressure than when the pressure in the negative pressure chamber of the vacuum booster is close to a vacuum pressure.

The determined urgent-operation judgment threshold used during the automatic stop state of the engine may be constituted by (a) a value which is not larger than a fixed value X, and which is smaller when the booster negative pressure is close to the atmospheric pressure than when the booster negative pressure is close to the vacuum pressure, where the urgent-operation judgment threshold used during the activation state of the engine is constituted by this fixed value X, or (b) a value ($AXs-\Delta$) that is smaller than a variable value AX by a given value, where the urgent-operation judgment threshold used during the activation state is constituted by this variable value AX (that is determined to be smaller when the booster negative pressure is close to the atmospheric pressure than when the booster negative pressure is close to the vacuum pressure).

Since the delay of boosting by the booster is made larger when the booster negative pressure is close to the atmospheric pressure than when the booster negative pressure is close to the vacuum pressure, it is appropriate that the determined urgent-operation judgment threshold is smaller when the booster negative pressure is close to the atmospheric pressure than when the booster negative pressure is close to the vacuum pressure. The urgent-operation judgment threshold may be a value that varies, depending on change of the booster negative pressure, either in a continuous manner or in a stepped manner.
(8) The vehicle control system according to any one of modes (5)-(7), wherein the urgent-operation judgment-threshold determining portion includes a limited-case-reduced-threshold determining portion configured to determine a limited-case-reduced value as the urgent-operation judgment threshold that is to be used during the automatic stop state of the engine, such that the determined urgent-operation judgment threshold used during the automatic stop state is smaller when a pressure in the negative pressure chamber of the vacuum booster is closer to an atmospheric pressure than to a vacuum-pressure-shortage-judgment threshold, than the urgent-operation judgment threshold used during the activation state of the engine.

The booster negative pressure is not necessarily close to the atmospheric pressure even during the automatic stop state of the engine. Further, when the booster negative pressure is close to the vacuum pressure, the necessity of reducing the urgent-operation judgment threshold is low.

In view of this, the urgent-operation judgment threshold, which is to be used during the automatic stop state of the engine, may be determined to be smaller than the urgent-operation judgment threshold used during the activation state of the engine, when an obtained actual value of the booster negative pressure is closer to the atmospheric pressure than to the vacuum-pressure-shortage-judgment threshold.

Consequently, as compared with an arrangement in which the urgent-operation judgment threshold used during the automatic stop state is always smaller than that used during the activation state of the engine, the consumption of the electric power can be reduced, because the assisting control is allowed to be carried out only when the assisting control is really required to be carried out.
(9) The vehicle control system according to any one of modes (4)-(8), wherein the urgent-operation assisting control portion includes a portion configured to regard that the starting condition is satisfied when the hydraulic-pressure-related value and the increase rate of the hydraulic-pressure-related value are larger than the respective urgent-operation judgment thresholds regarding the hydraulic-pressure-related value and the increase rate of the hydraulic-pressure-related value, and configured to start the assisting control when regarding that the starting condition is satisfied.

In the vehicle control system according to this mode, when the hydraulic-pressure-related value and also the increase rate of the hydraulic-pressure-related value relative to time are large, it is judged that an urgent operation is carried out and it is regarded that the starting condition has been satisfied. It is possible to more accurately judge whether an urgent operation is carried out or not, as compared with an arrangement in which it is judged that an urgent operation has been carried out, when the increase rate of the hydraulic-pressure-related value is larger than the urgent-operation judgment threshold.

(10) The vehicle control system according to any one of modes (4)-(9), wherein the urgent-operation assisting control portion includes a braking-force-insufficiency assisting control portion configured to regard that the starting condition is satisfied when the increase rate of the hydraulic-pressure-related value is larger than the urgent-operation judgment threshold regarding the increase rate of the hydraulic-pressure-related value and the hydraulic-pressure-related value is smaller than an assist-need-judgment threshold, and configured to start the assisting control when regarding that the starting condition is satisfied.

When the hydraulic-pressure-related value is large, the output of the brake is large so that the necessity of carrying out the assisting control is low. Therefore, in the vehicle control system according to this mode, the assisting control is started when the hydraulic-pressure-related value is smaller than the assist-need-judgment threshold and the necessity of carrying out the assisting control is high.

(11) The vehicle control system according to mode (10), wherein the starting-condition determining portion includes an assist-need-judgment threshold determining portion configured to determine the assist-need-judgment threshold that is to be used during the automatic stop state of the engine such that the determined assist-need-judgment threshold used during the automatic stop state is not smaller than the assist-need-judgment threshold used during the activation state of the engine.

When the booster negative pressure is close to the atmospheric pressure, the master-cylinder hydraulic pressure is made relatively small due to a delay of boosting by the booster. Therefore, in the vehicle control system according to this mode, the assist-need-judgment threshold, which is to be used during the automatic stop state of the engine, is determined to be equal to or larger than that used during the activation state of the engine.

During the automatic stop state of the engine, the assisting control can be started even with the operating force applied to the brake operating member being larger, as compared with during the activation state of the engine. Thus, it is possible to cause a region in which the assisting control is carried out, to be wider during the automatic stop state of the engine, than during the activation state of the engine, and according to improve a safety property.

(12) The vehicle control system according to mode (11), wherein the assist-need-judgment threshold determining portion includes (a) a portion configured to determine the assist-need-judgment threshold that is to be used during the automatic stop state of the engine such that the determined assist-need-judgment threshold used during the automatic stop state of the engine is larger than the assist-need-judgment threshold used during the activation state of the engine, by a given value, and/or (b) a portion configured to determine the assist-need-judgment threshold that is to be used during the automatic stop state such that the determined assist-need-judgment threshold used during the automatic stop state is larger than the assist-need-judgment threshold used during the activation state and such that the determined assist-need-judgment threshold used during the automatic stop state is larger when the booster negative pressure is close to an atmospheric pressure than when the booster negative pressure is close to a vacuum pressure.

The assist-need-judgment threshold, which is to be used during the automatic stop state, may be constituted by a value larger than that used during the activation state, by a given value. This given value may be either a fixed value or a variable value that is determined depending on the booster negative pressure or the like. Further, the assist-need-judgment threshold used during the automatic stop state may be constituted by a value which is larger than that used during the activation state and which is larger when the booster negative pressure is close to the atmospheric pressure than when the booster negative pressure is close to the vacuum pressure.

(13) The vehicle control system according to any one of modes (1)-(12), wherein the automatic-stop assisting control portion includes an to assist-amount determining portion configured to determine the assist amount such that the determined assist amount is larger during the automatic stop state of the engine than during the activation state of the engine.

The assist amount, which is to be used during the activation state of the engine, may be constituted by either (a) a fixed value or (b) a variable value. Where the assist amount is constituted by a variable value, the assist amount may be determined, for example, based on the operational state of the brake operating member or based on a relative positional relationship between the vehicle and another vehicle preceding the vehicle in question.

The assist amount, which is to be used during the automatic stop state of the engine, may be constituted by either (a) a fixed value (Y+Δ) that is larger than the assist amount used during the activation state, where the assist amount used during the activation state is the fixed value Y or (b) a value (AY+Δ) that is larger than a variable value AY by a given value, where the assist amount used during the activation state is the variable value AY. Further, the assist amount used during the automatic stop state can be made larger than the assist amount used during the activation state, by determining them in accordance with respective rules different from each other.

(14) The vehicle control system according to mode (13), wherein the assist-amount determining portion includes a booster-negative-pressure-based assist-amount determining portion configured to determine the assist amount that is to be used during the automatic stop state of the engine such that the determined assist amount during the automatic stop state is larger when a pressure in the negative pressure chamber of the vacuum booster is close to an atmospheric pressure than when the pressure in the negative pressure chamber is close to a vacuum pressure.

Since the maximum boosting force is smaller when the booster negative pressure is close to the atmospheric pressure than the booster negative pressure is close to the vacuum pressure, the master-cylinder hydraulic pressure after the booster has reached the boosting limit is smaller when the booster negative pressure is close to the atmospheric pressure than the booster negative pressure is close to the vacuum pressure. Further, also before the booster has reached the boosting limit, the master-cylinder hydraulic pressure is smaller when the booster negative pressure is close to the atmospheric pressure than the booster negative pressure is close to the vacuum pressure. Therefore, by determining the assist amount such that the determined assist amount is larger when the booster negative pressure is close to the atmospheric pressure than when the booster negative pressure is close to the vacuum pressure, the braking force insufficiency and the brake response delay can be reduced even when the booster negative pressure is close to the atmospheric pressure. Further, it is possible to obtain substantially the same magnitude of the braking force as during the activation state of the engine.

It is noted that an amount Δ, which is to be added to the assist amount Y, may be determined also depending on the magnitude of the booster negative pressure.

(15) The vehicle control system according to any one of modes (3)-(14), wherein the brake control device includes a post-boosting-limit assisting control portion configured to regard that the starting condition is satisfied when a hydraulic-pressure-related value is larger than a boosting-limit judgment threshold so that it is judged that the vacuum booster has reached a boosting limit, and configured to start the assisting control when regarding that the starting condition is satisfied, the hydraulic-pressure-related value being constituted by at least one of the hydraulic pressure in the master cylinder and a physical value having one-to-one relationship with the hydraulic pressure in the master cylinder.

The output of the brake is increased after the booster has reached the boosting limit, such that a relationship between the brake operating force and the master-cylinder hydraulic pressure after the booster has reached the boosting limit is substantially the same as the relationship before the booster reaches the boosting limit. Owing to this arrangement, it is possible to restrain a so-called brake feeling from being affected by the booster having reached the boosting limit.

(16) The vehicle control system according to mode (15), wherein the starting-condition determining portion includes a boosting-limit-judgment-threshold determining portion configured to determine the boosting-limit judgment threshold such that the determined boosting-limit judgment threshold is smaller during the automatic stop state of the engine than during the activation state of the engine.

(17) A braking apparatus for a vehicle, including:
a brake provided for each of wheels, for restraining rotation of the wheel;
a vacuum booster configured to boost an operating force applied to the brake operating member, owing to a pressure difference between a negative pressure chamber and a variable pressure chamber of the vacuum booster, and configured to output the boosted operating force;
a master cylinder configured to cause a pressurizing piston of the master cylinder to be moved forwardly by the boosted operating force outputted by the vacuum booster, so as to generate a hydraulic pressure in a pressurized chamber located on a front side of the pressurizing piston; and
an urgent-operation assisting control device configured to increase an output of the brake when an increase rate of the hydraulic pressure in the pressurized chamber of the master cylinder exceeds an urgent-operation judgment threshold, such that an amount of the increased output becomes larger than an amount corresponding to an operational state of a brake operating member of the vehicle,
wherein the urgent-operation assisting control device includes a threshold-value determining portion configured to determine the urgent-operation judgment threshold such that the determined urgent-operation judgment threshold is smaller when a pressure in the negative pressure chamber is close to an atmospheric pressure than when the pressure in the negative pressure chamber is close to a vacuum pressure.

In the braking apparatus described in this mode, the urgent-operation judgment threshold is determined such that the determined urgent-operation judgment threshold is smaller when the pressure in the negative pressure chamber of the vacuum booster is close to the atmospheric pressure than when the pressure in the negative pressure chamber is close to the vacuum pressure. Owing to this arrangement, an urgent assisting control can be suitably executed even when the pressure in the negative pressure chamber is close to the atmospheric pressure.

The technical features described in any one of the above-described modes (1)-(16) may be employed in the vehicle control system described in this mode.

BRIEF DESCRIPTION OF DRAWINGS

FIG. 8 (b) is a view conceptually showing a region in which an assisting control is started in the above-described brake control device.

MODES FOR CARRYING OUT THE INVENTION

There will be described vehicle control systems as modes for carrying out the present invention, with reference to drawings.

Firstly, there will be described arrangements common to the vehicle control systems according a plurality of embodiments of the present invention.

[Common Arrangements]

Figure 1:
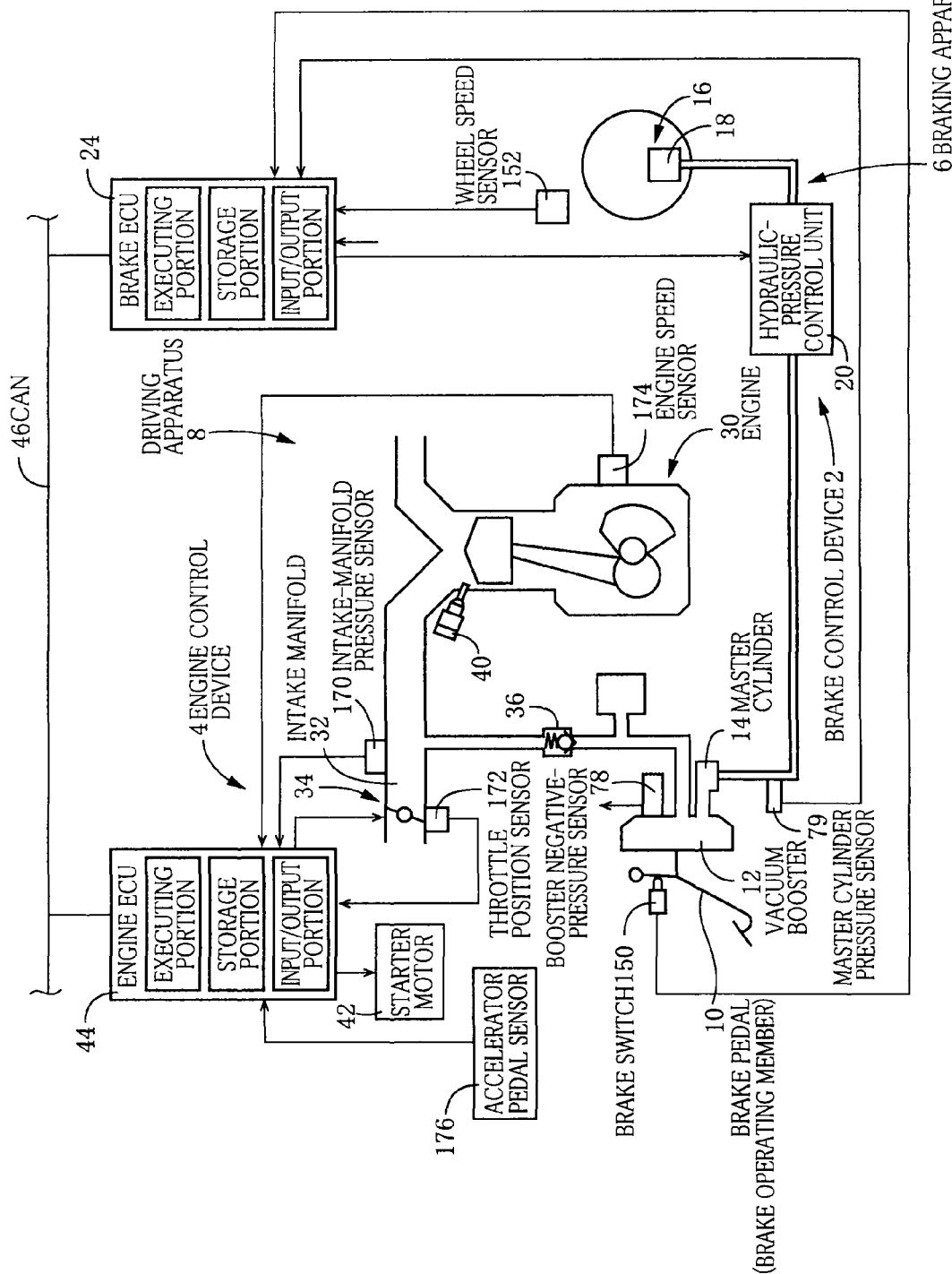
FIG. 1 is a view conceptually showing an entirety of a vehicle control system that is common to a plurality of embodiments of the present invention.

As shown in FIG. 1, the vehicle control system is provided with a braking apparatus 6 and a driving apparatus 8 that include a brake control device 2 and an engine control device 4, respectively.

In the braking apparatus 6, a depressing force applied to a brake pedal 10 is boosted by a vacuum booster 12, and a hydraulic pressure based on the boosted depressing force is generated in a master cylinder 14. The generated hydraulic pressure is supplied to a brake cylinder 18 of a brake 16 that is provided for a wheel, whereby the brake 16 is activated so as to restrain rotation of the wheel. Between the brake cylinder 18 and the master cylinder 14, a hydraulic-pressure control unit 20 is provided to serve as an actuator capable of controlling the hydraulic pressure in the brake cylinder 18. The hydraulic-pressure control unit 20 is controlled by a brake ECU 24 constituted principally by a computer including an executing portion, a storage portion and an input/output portion, so as to control the hydraulic pressure in the brake cylinder 18.

The vacuum booster (hereinafter simply referred to as "booster") 12 is connected at its negative pressure chamber (that will be described later) to an intake manifold 32 of an engine 30, so that a negative pressure is supplied to the booster 12 by activation of the engine 30. The intake manifold 32 is located on an intake side of a combustion chamber, so as to be brought into communication with an atmosphere via an electronically-controlled throttle valve 34.

A check valve 36 is provided between the booster 12 and the intake manifold 32, so that a difference between an atmospheric pressure and the negative pressure in the booster 12 is avoided from becoming smaller than a difference between the atmospheric pressure and the negative pressure in the intake manifold 32.

In the driving apparatus 8, a fuel injection device 40 of the engine 30, a starter motor 42 and a throttle valve 34 are controlled by an engine ECU 44 constituted principally by a computer including an executing portion, a storage portion and an input/output portion, so as to control an activation state of the engine 30. The brake ECU 24 and the engine ECU 44 are connected to each other via CAN (Car Area Network) 46, so that various information are transmitted therebetween.

Figure 2:
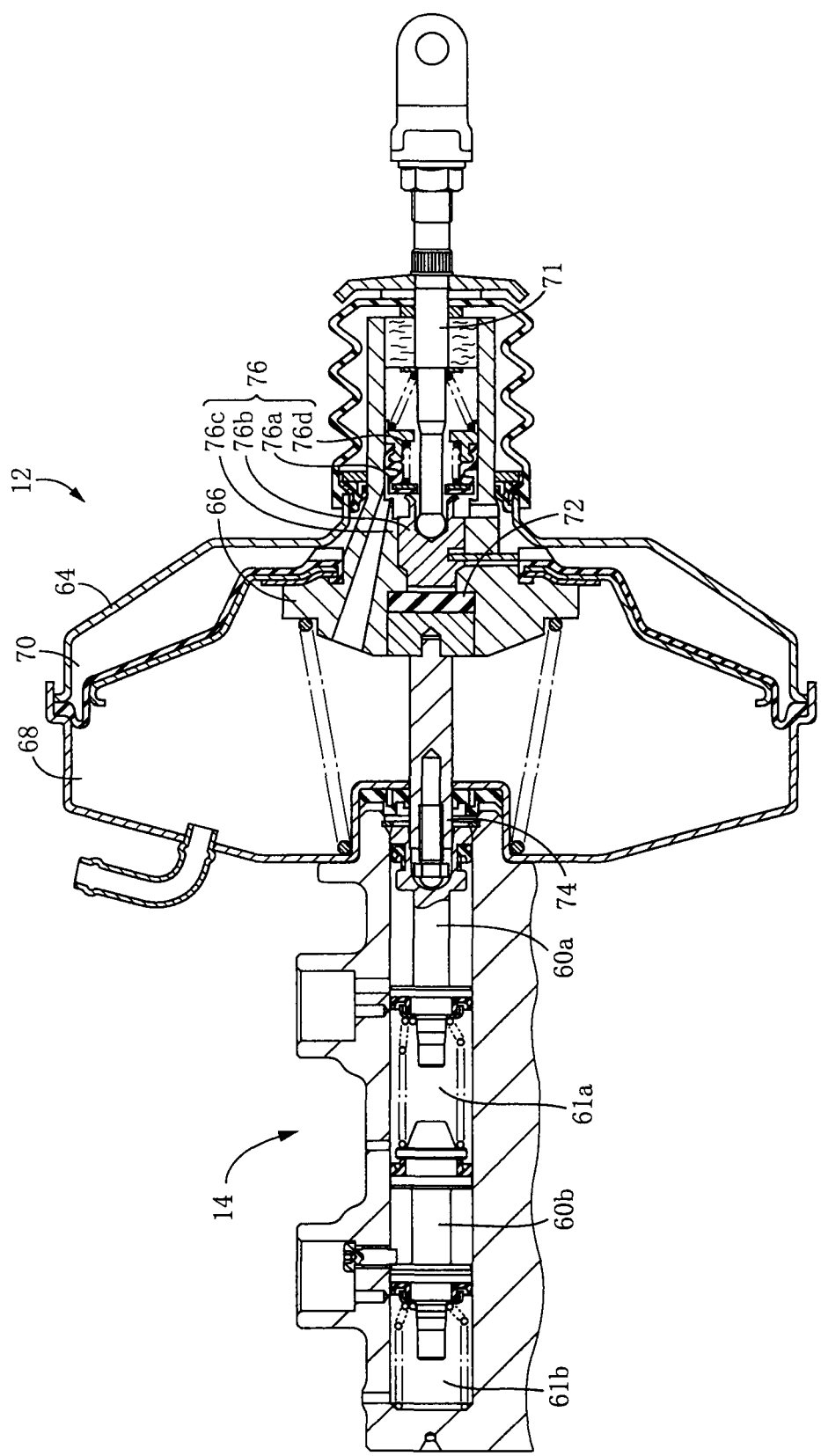
FIG. 2 is a cross sectional view showing a vacuum booster and a master cylinder that are included in a braking apparatus provided in a vehicle on which the above-described vehicle control system is installed.

In the braking apparatus 6, the master cylinder 14 is of a tandem type, and includes two pressurizing pistons 60a, 60b which are arranged in a series and which are slidably fitted in a housing of the master cylinder 14, as shown in FIG. 2. The pressurizing pistons 60a, 60b define two pressurized chambers 61a, 61b each of which is located on a front side of a corresponding one of the pressurizing pistons 60a, 60b.

The booster 12 includes a hollow housing 64 and a power piston 66 that is disposed in the housing 64. An inner space within the housing 64 is partitioned, by the power piston 66, into two chambers, i.e., a negative pressure chamber 68 located on the side of the master cylinder 14 and a variable pressure chamber 70 located on the side of the brake pedal 10.

The power piston 66 is connected, at its portion on the side of the brake pedal 10, to the brake pedal 10 via a valve operating rod 71, and is connected, at its portion on the side of the master cylinder 14, to a booster piston rod 74 via a reaction disk 72. The booster piston rod 74 is connected to the pressurizing piston 60a of the master cylinder 14, so as to transmit an activation force of the power piston 66 to the pressurizing piston 60a.

A valve mechanism 76 is provided between the negative pressure chamber 68 and the variable pressure chamber 70. The valve mechanism 76 is to be activated based on a relative movement of the valve operating rod 71 and the power piston 66, and includes a control valve 76a, an air valve 76b, a vacuum valve 76c and a control valve spring 76d. The air valve 76b is provided to be movable integrally with the valve operating rod 71, and cooperates with the control valve 76a to selectively establish and cut off communication between the variable pressure chamber 70 and the atmosphere. The control valve 76a is attached to the valve operating rod 71, and is biased by the control valve spring 76d in such a direction that causes the control valve 76a to be seated on the air valve 76b. The vacuum valve 76c is provided to be movable integrally with the power piston 66, and cooperates with the control valve 76a to selectively establish and cut off communication between the variable pressure chamber 70 and the negative pressure chamber 68.

In the booster 12 constructed as described above, during its non-activation state, the control valve 76a is seated on the air valve 76b, and is separated from the vacuum valve 76c, whereby the variable pressure chamber 70 is isolated from the atmosphere, and is in communication with the negative pressure chamber 68. Therefore, during this non-activation state, a pressure in the negative pressure chamber 68 and a pressure in the variable pressure chamber 70 are made equal to each other, and are lower than the atmospheric pressure. On the other hand, during an activation state of the booster 12, the valve operating rod 71 is moved toward the power piston 66, and the control valve 76a is eventually seated on the vacuum valve 76c, whereby the variable pressure chamber 70 is isolated from the negative pressure chamber 68. Thereafter, when the valve operating rod 71 is further moved toward the power piston 66, the air valve 76b is separated from the control valve 76a whereby the variable pressure chamber 70 is brought into communication with the atmosphere. In this activation state, the pressure in the variable pressure chamber 70 becomes close to the atmospheric pressure, while a pressure difference is established between the negative pressure chamber 68 and the variable pressure chamber 70. Owing to the established pressure difference, the power piston 66 is moved forwardly, so that a hydraulic pressure, which is based on the brake operating force boosted by the booster 12, is generated in the master cylinder 14.

The pressure in the negative pressure chamber 68 (hereinafter abbreviated to as "booster negative pressure" where appropriate) is detected by a booster negative-pressure sensor 78, while the pressure in the pressurized chamber 61b of the master cylinder 14 is detected by a master-cylinder pressure sensor 79.

Figure 3:
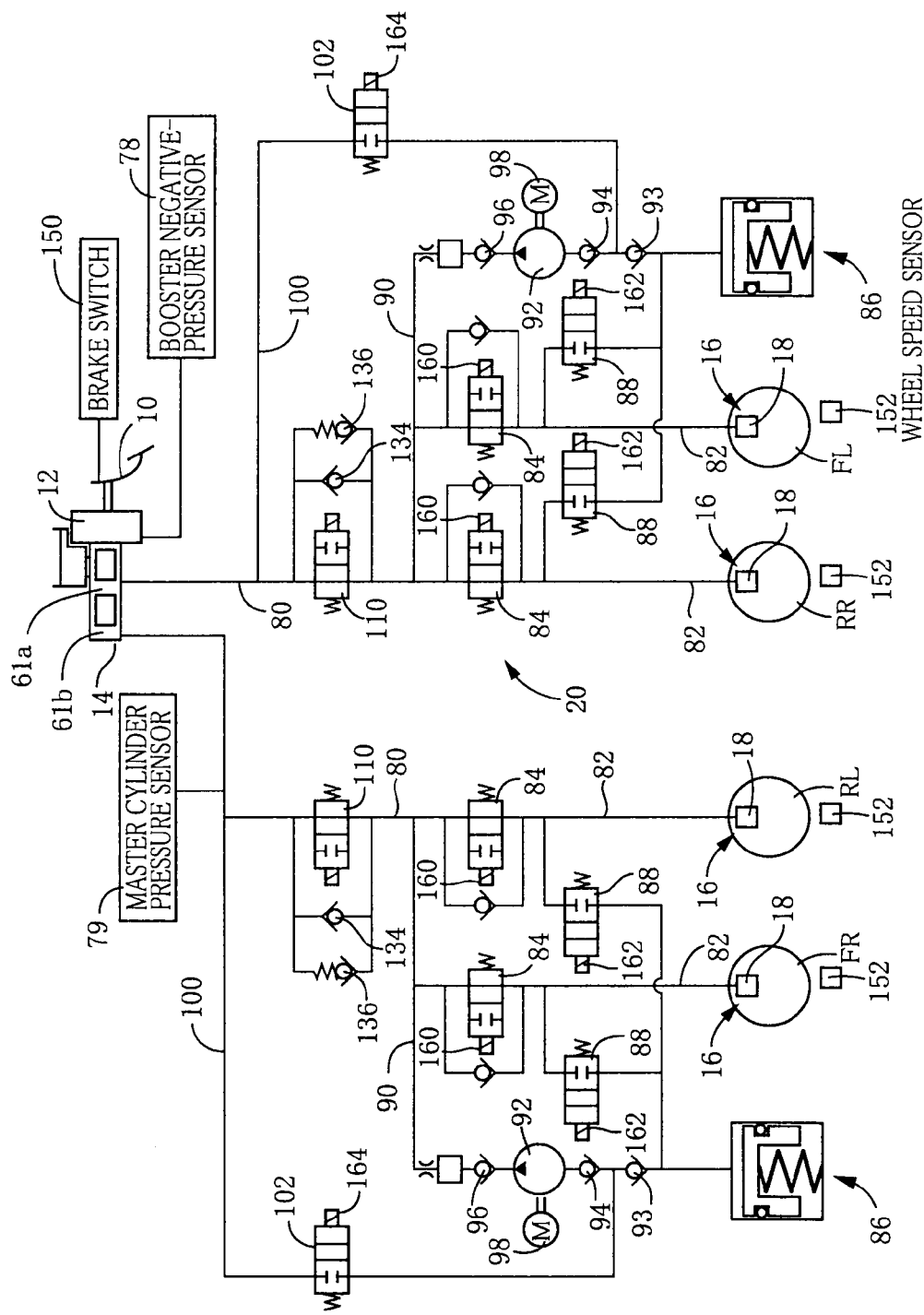
FIG. 3 is a hydraulic circuit diagram of the above-described braking apparatus.

As shown in FIG. 3, the brake cylinders 18 of the brakes 16 provided for a front right wheel FR and a rear left wheel RL are connected to the pressurized chamber 61b of the master cylinder 14, while the brake cylinders 18 of the brakes 16 provided for a front left wheel FL and a rear right wheel RR are connected to the pressurized chamber 61a of the master cylinder 14. In each of the plurality of embodiments of the invention, the braking apparatus 6 includes a hydraulic brake circuit having a so-called "X pipe arrangement". A brake line constituted by the pressurized chamber 61a and the brake cylinders 18 provided for the front right wheel FR and rear left wheel RL will be described. Another brake line constituted by the pressurized chamber 61b and the brake cylinders 18 provided for the front left wheel FL and rear right wheel RR will not be described, since this brake line for the front left wheel FL and rear right wheel RR is the same in construction as the brake line for the front right wheel FR and rear left wheel RL.

Each of the brake cylinders 18 provided for the front right wheel FR and rear left wheel RL is connected to the pressurized chamber 61b via a main passage 80 and an individual passage 82. Each individual passage 82 is provided with a pressure increasing valve 84, while each reservoir passage connecting the corresponding brake cylinder 18 and a reservoir 86 is provided with a pressure reducing valve 88.

A pump passage 90 is connected to the reservoir 86, and is connected also to a portion of the main passage 80 which is located on an upstream side of the pressure increasing valve 84. The pump passage 90 is provided with, for example, a pump 92, inlet valves 93, 94 and a delivery valve 96. The pump 92 is to be activated by a pump motor 98. The master cylinder 14 is connected, via a supplementary passage 100, to a portion of the pump passage 90 which is located between the inlet valves 93, 94. The supplementary passage 100 is provided with a supplementary valve 102.

A pressure control valve 110 is provided in a portion of the main passage 80 which is located between the master cylinder 14 and the above-described portion of the main passage 80 to which the pump passage 90 is connected. The pressure control valve 110 is configured to control a difference between the hydraulic pressure on the side of the brake cylinder 18 and the hydraulic pressure on the side of the master cylinder 14, such that the hydraulic pressure in the brake cylinder 18 is higher than the hydraulic pressure in the master cylinder 14 by a desired difference.

Figure 4:
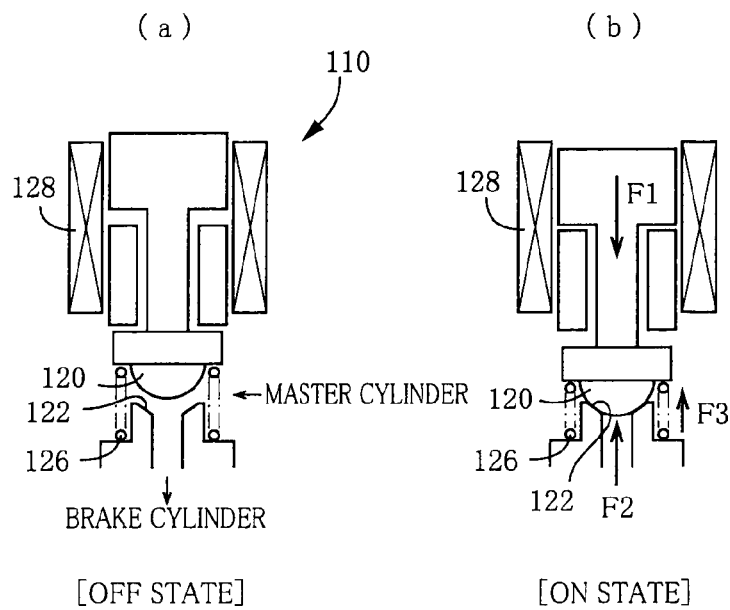
FIG. 4 is a set of views conceptually showing activation of a pressure control valve included in the above-described braking apparatus.

As shown in FIG. 4, the pressure control valve 110 is a normally open valve including a housing (not shown), a valve body 120, a valve seat 122 and a spring 126 that biases the valve body 120 in a direction away from the valve seat 122. The pressure control valve 110, which is provided in the main passage 80, has such a posture that causes the valve body 120 to receive a pressure difference corresponding to a value that is obtained by subtracting the hydraulic pressure in the master cylinder 14 from the hydraulic pressure in the brake cylinder 18. With an electric current being supplied to a solenoid 128, an electromagnetic force is generated to force the valve body 120 to be moved toward the valve seat 122.

When the solenoid 128 is not being energized, namely, when the pressure control valve 110 is held in its non-activation state (i.e, OFF state), the valve 110 is held in its open state. When a braking operation is carried out with the pressure control valve 110 being held in its open state, the brake cylinder pressure is equalized to the master-cylinder hydraulic pressure, so as to be increased with increase of the master-cylinder hydraulic pressure.

When the solenoid 128 is being energized, namely, when the pressure control valve 110 is held in its activation state (i.e., ON state), the valve body 120 receives an attractive force F1 based on the electromagnetic force generated by the solenoid 128, a force F2 based on the difference between the brake-cylinder hydraulic pressure and the master-cylinder hydraulic pressure and an elastic force F3 generated by the spring 126, such that a sum of the force F2 and the elastic force F3 acts on the valve body 120 in one of opposite directions while the attractive force F1 acts on the valve body 120 in the other of the opposite directions. As long as the elastic force F3 is constant in magnitude, the force F2 based on the difference between the brake-cylinder hydraulic pressure and the master-cylinder hydraulic pressure is larger when the attractive force F1 is large than when the attractive force F1 is small. Thus, the pressure difference is controlled by controlling the electric current supplied to the solenoid 128.

It is noted that, as shown in FIG. 3, a check valve 134 and a relief valve 136 is provided in parallel with the pressure control valve 110. Owing to the provision of the check valve 134, a working fluid is allowed to flow from the master cylinder 14 toward the brake cylinder 18 even in the event of failure of the pressure control valve 110. Further, owing to the provision of the relief valve 136, it is possible to avoid an excessive increase of the hydraulic pressure on the side of the brake cylinder, i.e., the pressure of the working fluid delivered from the pump 92.

In the arrangements common to the plurality of embodiments, the hydraulic-pressure control unit 20 is constituted by, for example, the pressure control valve 110, reservoir 86, pump 92 and pump motor 98.

[Control by Brake ECU]

As shown in FIG. 1, to the input portion of the brake ECU 24, not only the above-described booster negative-pressure sensor 78 and master-cylinder pressure sensor 79 but also a brake switch 150, a wheel speed sensor 152 and the like are connected. The brake switch 150 is configured to output ON signal when the brake pedal 10 is being operated. The wheel speed sensor 152 is provided for each one of the wheels, and is configured to output a signal indicative of a speed of the wheel. In the brake ECU 24, a running velocity of the vehicle is obtained based on the velocities of the respective four wheels. To the output portion of the brake ECU 24, the pump motor 98 is connected via a drive circuit (not shown), and the solenoid 128 of the pressure control valve 110 and the solenoids 160, 162, 164 of the pressure increasing valve 84, pressure reducing valve 88 and supplementary valve 102 are connected via respective drive circuits (not shown). Further, the brake ECU 24 stores, in its storage portion, a plurality of programs, tables and the like.

Figure 5:
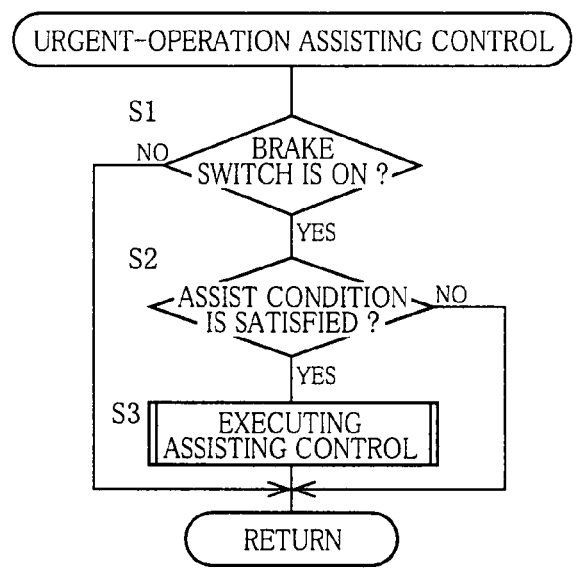
FIG. 5 is a flow chart showing an urgent-operation assisting control program stored in a storage portion of a brake ECU of a brake control device that is included in the above-described vehicle control system.

In the brake ECU 24, an urgent-operation assisting-control program represented by a flow chart of FIG. 5, is executed at a predetermined time interval.

In the arrangements common to the plurality of embodiments, when an urgent operation is carried out on the brake pedal 10, an urgent-operation assisting control is executed for causing the hydraulic pressure in the brake cylinder 18 to be higher than the hydraulic pressure in the master cylinder 14, i.e., a hydraulic pressure corresponding to the operating force applied to the brake pedal 10. When the urgent-operation assisting control is being executed, the pressure control valve 110 is controlled with the supplementary valve 102 being placed in its open state and with the pump 92 being activated. The hydraulic pressure in the brake cylinder 18 is made higher than the hydraulic pressure in the master cylinder 14, by an amount corresponding to an amount of the electric current supplied to the pressure control valve 110. In the urgent-operation assisting control, the hydraulic pressure in the brake cylinder 18 can be made higher than the hydraulic pressure in the master cylinder 14 (a) by a predetermined assist amount (fixed value), (b) by an assist amount that is determined depending on a state of the vehicle such as a distance between the vehicle and another vehicle preceding the vehicle in question, or (c) by an assist amount ΔPw (=Pm·K) that is determined depending on the operational state (for example, the master-cylinder hydraulic pressure Pm) of the brake pedal 10.

The urgent-operation assisting control is initiated with step S1 that is implemented to judge whether the brake switch 150 is being placed in it ON state or not. When the brake switch 150 is being placed in it ON state, step S2 is implemented to judge whether an assist condition as a starting condition is being satisfied or not. It is judged that the assist condition is satisfied when the urgent operation of the brake pedal 10 is detected. When the assist condition is satisfied, step S3 is implemented to execute the assisting control.

As described above, in the arrangements common to the plurality of embodiments of the invention, the brake control device is constituted by, for example, the brake ECU 24 and the hydraulic-pressure control unit 20. Further, the urgent-operation assisting control portion is constituted by, for example, portions of the brake ECU 24 which are assigned to store and execute the urgent-operation assisting control program.

It is noted that, although the hydraulic brake circuit of the braking apparatus 6 has the "X pipe arrangement" in the arrangements common to the plurality of embodiments, the construction of the braking apparatus 6 is particularly limited. For example, one of the two brake lines may be provided for the front right and left wheels while the other of the two brake lines may be provided for the rear right and left wheels.

[Control by Engine ECU]

To the engine ECU 44, there are connected an intake-manifold negative-pressure sensor 170, a throttle position sensor 172, an engine speed sensor 174 and an accelerator pedal sensor 176. The intake-manifold negative-pressure sensor 170 is provided to detect the negative pressure in the intake manifold 32. The throttle position sensor 172 is provided to detect an opening degree of the electronically-controlled throttle valve 34. The engine speed sensor 174 is provided to detect a rotational speed of the engine 30. The accelerator pedal sensor 176 is provided to detect an opening degree of an accelerator pedal (not shown). To the engine ECU 44, there are also connected the above-described throttle valve 34, fuel injection device 40 and starter motor 42. Further, the engine ECU 44 stores, in its storage portion, a plurality of programs, tables and the like.

In the engine ECU 44, the operational state of the engine 30 is detected based on, for example, the throttle opening degree and the engine rotational speed, and the electronically-controlled throttle valve 34 and the fuel injection device 40 are controlled such that the actual operation state of the engine 30 corresponds to a desired operation state that is dependent on the accelerator opening degree detected by the accelerator pedal sensor 176.

Figure 6:
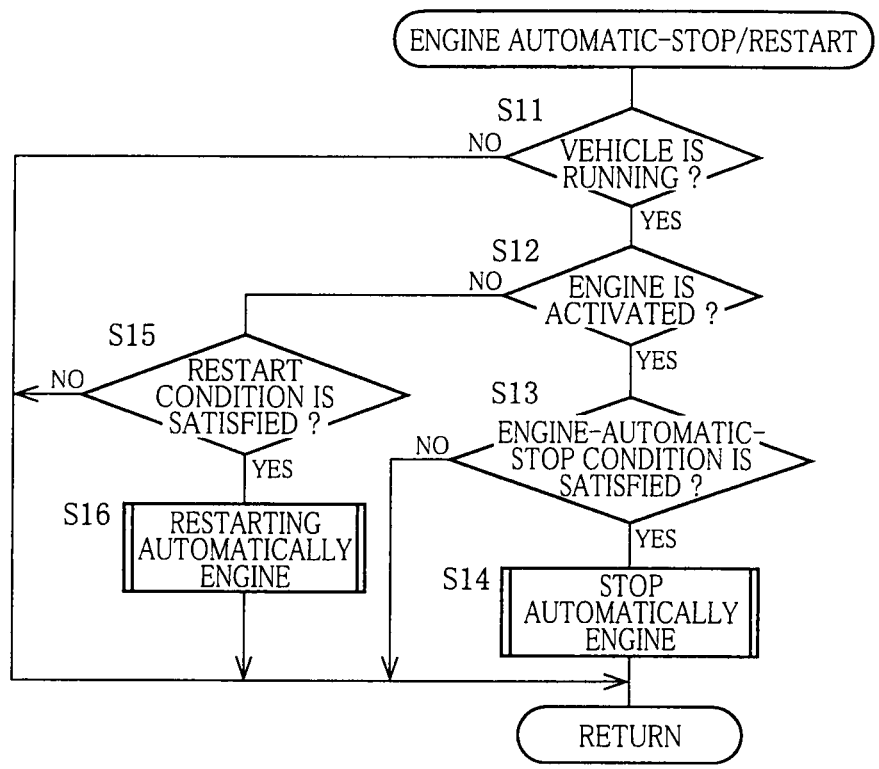
FIG. 6 is a flow chart showing an engine automatic-stop/restart program stored in a storage portion of an engine ECU of an engine control device that is included in the above-described vehicle control system.

Further, an engine automatic-stop/restart program represented by a flow chart of FIG. 6 is executed.

In the arrangements common to the plurality of embodiments, the engine 40 is automatically stopped during running of the vehicle, and is automatically restarted, so as to improve the fuel economy.

The routine in accordance with the engine automatic-stop/restart program is initiated with step S11 in which it is judged whether the vehicle is running or not. That is, it is judged whether the running velocity of the vehicle is higher than a predetermined velocity that makes it possible to regard that the vehicle is in its stop state. When the vehicle is running, step S12 is implemented to judge whether the engine 30 is in its activation state or not. When the engine 30 is in its activation state, step S13 is implemented to judge whether an engine-automatic-stop condition is being satisfied or not. When the condition is satisfied, step S14 is implemented to automatically stop the engine 40. The engine-automatic-stop condition is constituted by, for example, three requirements consisting of a requirement that the accelerator opening degree is not larger than such a degree that makes it possible to regard that the vehicle operator has no intention of accelerating the vehicle, a requirement that the running velocity of the vehicle is not higher than a given velocity and a requirement that a slope of a road surface is not larger than a given degree. Therefore, when all of the three requirements are satisfied, the engine 30 is automatically stopped. The supply of the fuel to the engine 30 is stopped, and a transmission is placed in its non-engagement state.

When the engine 30 is placed in its stop state, a negative judgment (NO) is obtained in step S12, and then step S15 is implemented to judge whether a restart condition is being satisfied or not. When the restart condition is satisfied, step S16 is implemented to automatically restart the engine 30. The restart condition is constituted by, for example, at least one of two requirements consisting of a requirement that the accelerator opening degree is not smaller than such a degree that makes it possible to regard that the vehicle operator has an intention of accelerating the vehicle and a requirement that the negative pressure in the negative pressure chamber 68 of the booster 12 is closer to the atmospheric pressure than to a given pressure. Therefore, when at least one of the two requirements is satisfied, it is regarded that the restart condition is satisfied, and the engine 30 is restarted. The supply of the fuel to the engine 30 is started by activation of the starter motor 42, and the transmission is switched from its non-engagement state to its engagement state.

As described above, in the arrangements common to the plurality of embodiments, the engine control device 4 is constituted by, for example, the engine ECU 44, starter motor 42, throttle valve 34 and fuel injection device 40. Further, a negative-pressure supplying mechanism is constituted by, for example, the check valve 36 and a passage connecting the negative pressure chamber 68 and the intake manifold 32.

It is noted that the automatic stop condition and the restart condition of the engine 30 are not necessarily limited to the above-described details of the arrangements common to the plurality of embodiments.

As described above, when the engine 30 is automatically stopped during running of the vehicle, the supply of the negative pressure to the negative pressure chamber 68 of the booster 12 is stopped in principle, so that there is a possibility that the pressure (hereinafter abbreviated to as "booster negative pressure" where appropriate) in the negative pressure chamber 68 of the booster 12 becomes close to the atmospheric pressure.

Figure 7:
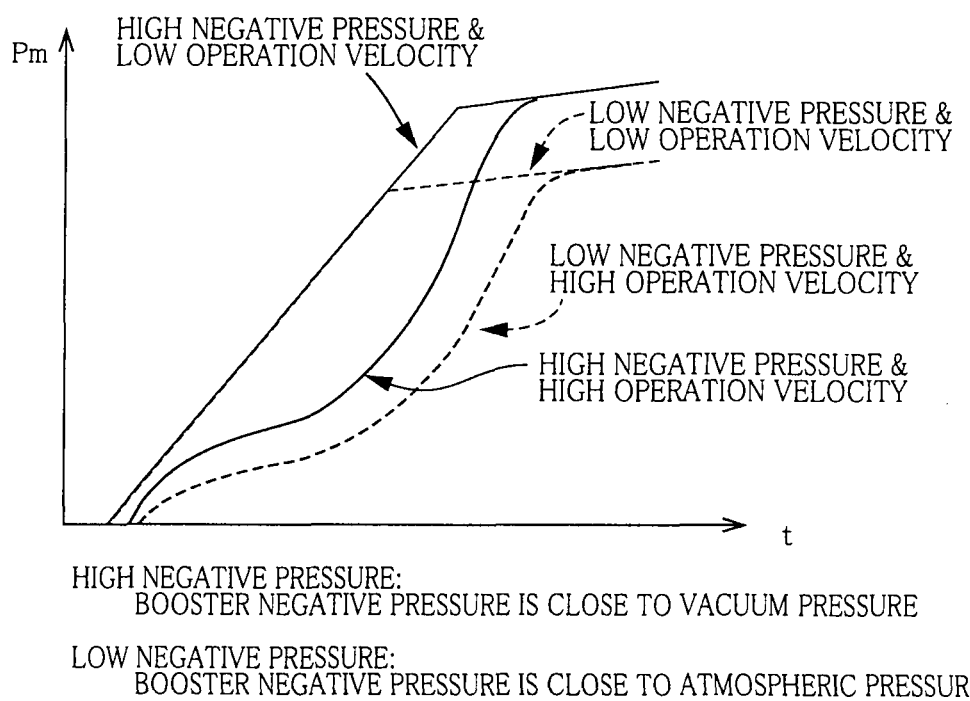
FIG. 7 is a view showing a change of hydraulic pressure in the master cylinder.

As shown in FIG. 7, upon execution of the urgent operation, the delay of increase of the master-cylinder hydraulic pressure is larger when the booster negative pressure is close to the atmospheric pressure than when the booster negative pressure is close to the vacuum pressure, so that the master-cylinder hydraulic pressure is lower when the booster negative pressure is close to the atmospheric pressure than when the booster negative pressure is close to the vacuum pressure. Further, when the booster negative pressure is close to the atmospheric pressure, since the maximum boosting force is small, the master-cylinder hydraulic pressure after the booster 12 has reached the boosting limit is low.

Thus, the master-cylinder hydraulic pressure is changed upon execution of the urgent operation, in a manner that varies depending on whether the booster negative pressure is close to the atmospheric pressure or the vacuum pressure. In this sense, it is appropriate that the assisting control is executed in a manner that varies depending on whether the engine 30 is being placed in the activation state or in the automatic state. The following are specific descriptions of the embodiments of the invention.

Embodiment 1

In this Embodiment 1, when the master-cylinder hydraulic pressure Pm detected by the master-cylinder pressure sensor 79 is larger than the urgent-operation judgment threshold ThP and also the increase rate (i.e., change with respect to time) of the master-cylinder hydraulic pressure is larger than the urgent-operation judgment threshold ThdP, it is regarded that the urgent operation of the brake pedal 10 is being or has been carried out, and that the assist condition (starting condition) is satisfied.

Pm>ThP
dPm>ThdP

That is, when the requirement that the increase rate dPm of the master-cylinder hydraulic pressure is larger than the urgent-operation judgment threshold ThdP and also the requirement that the master-cylinder hydraulic pressure Pm is larger than the urgent-operation judgment threshold ThP are both satisfied, the urgent operation is detected. Thus, it is possible to judge whether or not the urgent operation is being or has been carried out.

Figure 8:
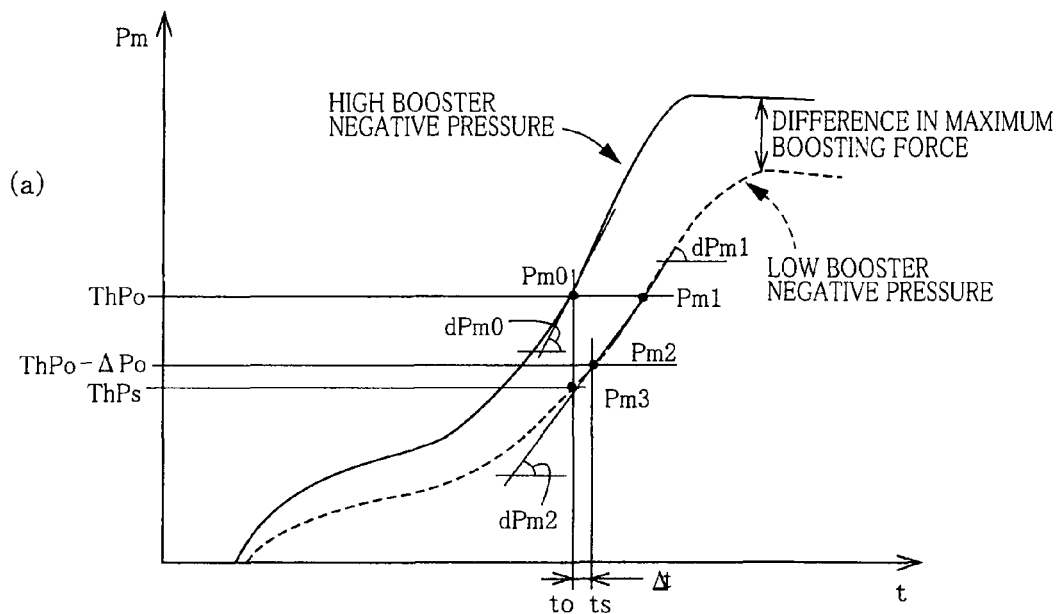
FIG. 8 (a) is a view showing a change of hydraulic pressure in the master cylinder of the braking apparatus that includes the brake control device included in the vehicle control system constructed according to Embodiment 1 of the present invention.
Figure 8:
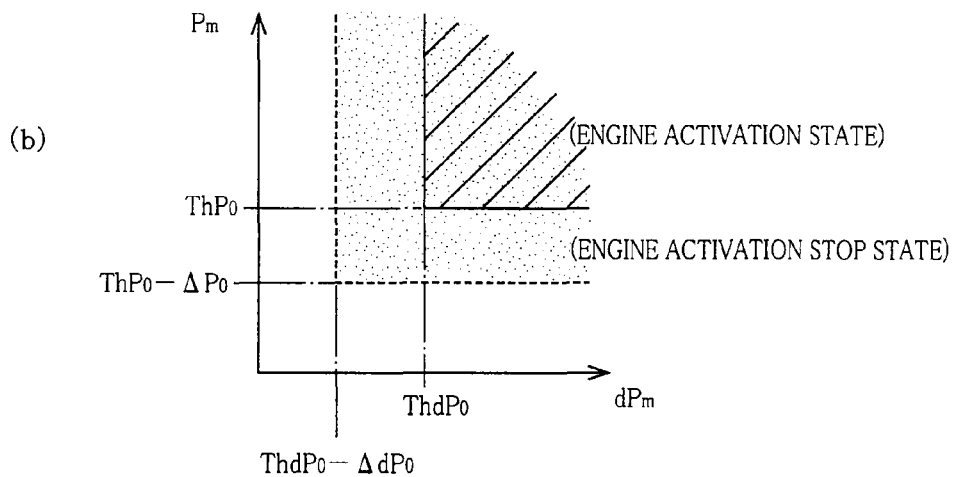

In FIG. 8 (a), a solid line represents the change of the master-cylinder hydraulic pressure in a case in which the urgent operation is carried out when the booster negative pressure is close to the vacuum pressure, while a broken line represents the change of the master-cylinder hydraulic pressure in a case in which the urgent operation is carried out when the booster negative pressure is close to the atmospheric pressure.

During the activation state of the engine 30, since it is estimated that the booster negative pressure is close to the vacuum pressure, the urgent-operation judgment thresholds $ThP_0$, $ThdP_0$ are determined based on change represented by the solid line of FIG. 8 (a).

However, during the automatic stop state of the engine 30, when the booster negative pressure is close to the atmospheric pressure, the delay of increase of the master-cylinder hydraulic pressure is large as shown by the broke line in FIG. 8 (a) so that there is a case where the assist condition is not satisfied because the actual increase rate dPm1 could be lower than the urgent-operation judgment threshold $ThdP_0$ (dPm1<$ThdP_0$) at a point of time at which the master-cylinder hydraulic pressure has reached the urgent-operation judgment threshold $ThP_0$.

For avoiding such a case, in the Embodiment 1, as shown in FIG. 8 (b), the urgent-operation judgment threshold regarding the master-cylinder hydraulic pressure and the urgent-operation judgment threshold regarding the increase rate of the master-cylinder hydraulic pressure are set to be smaller by a given pressure $\Delta P_0$ and a given rate $\Delta dP_0$, respectively, during the automatic stop state of the engine 30 than during activation state of the engine 30.

Further, the assist amount $\Delta Pw$, which is to be added in execution of the urgent-operation assisting control, is set to a predetermined fixed value (standard assist amount) $\Delta Pw_0$ during the activation state of the engine 30, but is set to another predetermined fixed value ($\Delta Pw=\Delta Pw_0+\Delta w$) that is larger than the standard assist amount $\Delta Pw_0$.

As shown in FIG. 8 (a), since the maximum boosting force is smaller when the booster negative pressure is close to the atmospheric pressure than when the booster negative pressure is close to the vacuum pressure, the master-cylinder hydraulic pressure after the booster 12 has reached the boosting limit is lower when the booster negative pressure is close to the atmospheric pressure than when the booster negative pressure is close to the vacuum pressure. Further, upon execution of the urgent operation, it is likely that the booster 12 reaches the boosting limit because it is common that the brake pedal 10 is operated by a large operating force. In view of this, in the Embodiment 1, the assist amount $\Delta Pw$ is set to be larger by an extra amount $\Delta w$ during the automatic stop state of the engine 30 than during the activation state of the engine 30. The extra amount $\Delta w$ is a predetermined fixed value that may be determined based on, for example, an average value or maximum value of a difference between (i) the maximum boosting force when the booster negative pressure is between a first given pressure and the atmospheric pressure and (ii) the maximum boosting force when the booster negative pressure is between a second given pressure and the vacuum pressure.

It is noted that the reduction of the master-cylinder hydraulic pressure with elapse of time, which can be appreciated in FIG. 8 (a), is caused because it is common that the operating force applied by the vehicle operator to the brake pedal 10 is gradually reduced with elapse of time.

Figure 9:
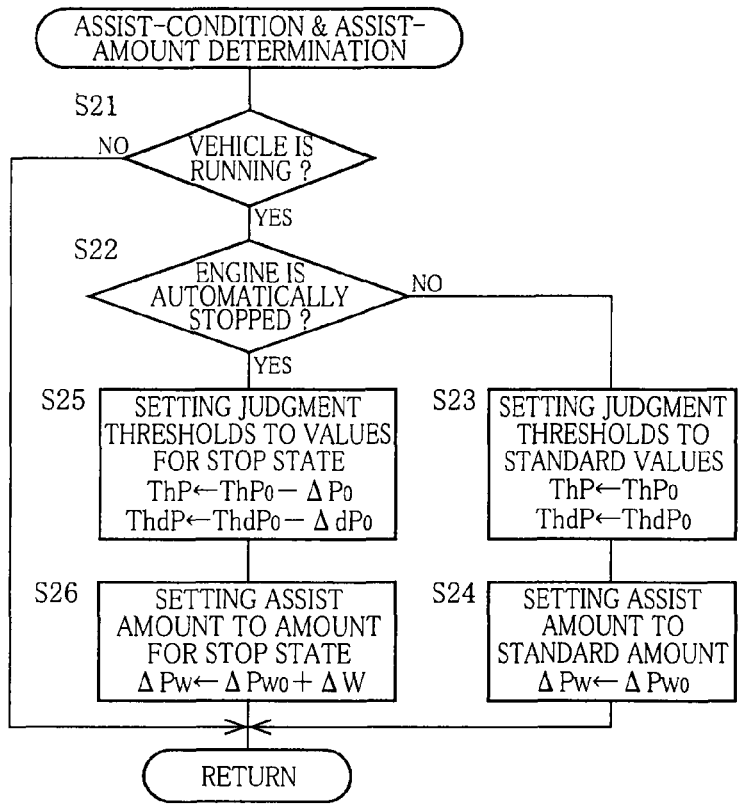
FIG. 9 is a flow chart showing an assist-condition & assist-amount determining program stored in the storage portion of the brake ECU of the above-described brake control device.

In the brake ECU 24, an assist-condition & assist-amount determining program represented by a flow chart of FIG. 9, is executed at a predetermined time interval, irrespective of whether or not the braking operation is carried out.

The routine in accordance with this assist-condition & assist-amount determining program is initiated with step S21 in which it is judged whether the vehicle is running or not. When the vehicle is running, step S22 is implemented to judge whether the engine 30 is in its automatic stop state or not. When the engine 30 is in its activation state, a negative judgment (NO) is obtained in step S22 whereby steps S23 and S24 are implemented. In step S23, the urgent-operation judgment threshold ThP regarding the master-cylinder hydraulic pressure and the urgent-operation judgment threshold ThdP regarding the increase rate of the hydraulic pressure are set to the respective standard values $ThP_0$, $ThdP_0$. In step S24, the assist amount $\Delta Pw$ is set to the standard assist amount $\Delta Pwo$.

ThP←$ThP_0$
ThdP←$ThdP_0$
$\Delta Pw$←$\Delta Pw_0$

On the other hand, when the engine 30 is being placed in its automatic stop state, steps S25 and S26 are implemented. In step S25, the urgent-operation judgment threshold ThP regarding the master-cylinder hydraulic pressure and the urgent-operation judgment threshold ThdP regarding the increase rate of the hydraulic pressure are set to the respective values ($ThP_0-\Delta P_0$), ($ThdP_0-\Delta dP_0$) that are smaller than the respective standard values. In step S26, the assist amount $\Delta Pw$ is set to the value ($\Delta Pw_0+\Delta w$) that is larger than the standard assist amount $\Delta Pw_0$.

ThP←$ThP_0-\Delta P_0$
ThdP←$ThdP_0-\Delta dP_0$
$\Delta Pw$←$\Delta Pw_0+\Delta w$ By execution of the urgent-operation assisting-control program, step S2 is implemented, during the braking operation, to detect the actual master-cylinder hydraulic pressure and obtain the increase rate of the master-cylinder hydraulic pressure, so as to judge whether the actual master-cylinder hydraulic pressure Pm is higher than the urgent-operation judgment threshold ThP and whether the increase rate dPm of the master-cylinder hydraulic pressure is higher than the urgent-operation judgment threshold ThdP (Pm>ThP, dPm>ThdP). When the master-cylinder hydraulic pressure is changed as shown in the broken line in FIG. 8 (a) during the automatic stop state of the engine 30, the assist condition is satisfied at a point is of time (Pm2>ThP, dPm2>ThdP) whereby the assisting control is started. Thus, the urgent-operation judgment threshold is set to be smaller during the automatic stop state of the engine 30 than during the activation state of the engine 30, so that the assisting control can be suitably started even when the booster negative pressure is close to the atmospheric pressure.

Further, when the assist condition is satisfied, step S3 is implemented to execute the assisting control with the assist amount that is larger than the standard assist amount. It is therefore possible to reduce the braking force insufficiency that is caused in the situation in which the booster negative pressure is close to the atmospheric pressure and the maximum boosting force is small. Further, owing to the increase of the assist amount even before the booster 12 reaches the boosting limit, it is possible to restrain the brake response delay due to delay of boosting by the booster 12.

In this Embodiment 1, the urgent-operation assisting control portion serves also as an automatic-stop assisting control portion. Further, an assist-amount determining portion is constituted by portions of the brake ECU 24 which are assigned to store and execute steps S24 and S26 of the assist-condition & assist-amount determining program represented by the flow chart of FIG. 9. A starting-condition determining portion is constituted by portions of the brake ECU 24 which are assigned to store and execute steps S23 and S25 of the assist-condition & assist-amount determining program. The starting-condition determining portion serves also as an urgent-operation judgment threshold determining portion and a fixed-threshold determining portion.

In the Embodiment 1, the urgent-operation judgment threshold regarding the master-cylinder hydraulic pressure and the urgent-operation judgment threshold regarding the increase rate of the master-cylinder hydraulic pressure are smaller by the given pressure $\Delta P_0$ and the given rate $\Delta dP_0$, respectively, during the automatic stop state of the engine 30 than during activation state of the engine 30. It is to be understood that each of the given pressure $\Delta P_0$ and the given rate $\Delta dP_0$ may be changed as needed.

For example, in the Embodiment 1, the assisting control is started late by the length of time $\Delta t$ when the master-cylinder hydraulic pressure is changed as shown by the broken line in FIG. 8 (a) (i.e., when the booster negative pressure is close to the atmospheric pressure), as compared with the master-cylinder hydraulic pressure is changed as shown by the solid line in FIG. 8 (a). However, it is possible to employ an arrangement in which the urgent-operation judgment threshold regarding the master-cylinder hydraulic pressure and the urgent-operation judgment threshold regarding the increase rate are set to respective smaller values ThPs {<(ThP$_0$−$\Delta P_0$)}, ThdPs {<(ThdP$_0$−$\Delta dP_0$)} wherein a given pressure $\Delta P$ and a given rate $\Delta dP$ are larger than the above-described given pressure $\Delta P_0$ and given rate $\Delta dP_0$, so that the assisting control can be started at the same point $t_0$ of time when the booster negative pressure is close to the atmospheric pressure as when the booster negative pressure is close to the vacuum pressure (Pm3>ThPs, dPm3>ThdPs).

Further, the urgent-operation judgment thresholds may be further reduced by using further increased given pressure $\Delta P$ and given rate $\Delta dP$, so that the assisting control can be started earlier (namely, before the point $T_0$ of time) than when the booster negative pressure is close to the vacuum pressure.

Further, during the automatic stop state of the engine 30, both of the urgent-operation judgment threshold ThP regarding the master-cylinder hydraulic pressure and the urgent-operation judgment threshold ThdP regarding the increase rate do not necessarily have to be set to respective smaller values, and only either one of the urgent-operation judgment thresholds ThP may be set to a smaller value.

Further, the urgent-operation judgment threshold may be set to a smaller value, when an actual value of the booster negative pressure $P_{B0}$, which is detected during the automatic stop state of the engine 30, is between a given pressure and the atmospheric pressure.

Further, the extra amount $\Delta w$ as the assist amount may be determined such that the determined extra amount $\Delta w$ is larger when an actual value of the booster negative pressure $P_{B0}$, which is detected during the automatic stop state of the engine 30, is close to the atmospheric pressure than when the detected value of the booster negative pressure $P_{B0}$ is close to the vacuum pressure. This is because the maximum boosting force is smaller when the booster negative pressure is close to the atmospheric pressure than when the booster negative pressure is close to the vacuum pressure.

Further, when the booster negative pressure is close to the vacuum pressure even during the automatic stop state of the engine 30, the assist amount may be set to be substantially the same as during the activation state of the engine 30. This is because the necessity of increasing the assist amount is low in such a case.

Further, although there has been described an arrangement in which the assist amount is set to the standard assist amount $\Delta P_{W0}$ during the activation state of the engine 30, the assist amount used during the activation state of the engine 30 may be set to, for example, an amount that is determined depending on the master-cylinder hydraulic pressure or an amount that is determined depending on a distance between the vehicle and another vehicle preceding the vehicle in question. Also in either of these cases, the assist amount for the automatic stop state of the engine 30 is larger than the assist amount for the activation state of the engine 30.

For example, in an arrangement in which the assist amount $\Delta Pw$ for the engine activation state is set to an amount ($\Delta Pw_0$=k·Pm) obtained by multiplying the master-cylinder hydraulic pressure Pm by a factor k (0<k<1), the assist amount $\Delta Pw$ for the engine stop state may be set to an amount $\Delta Pw$ {=$\Delta Pw_0$+k'·Pm=(k+k')·Pm} that is larger than the assist amount $\Delta Pw_0$ for the engine activation state by $\Delta w$=k'·Pm (0<k'<k)

Embodiment 2

In Embodiment 2, when the cylinder hydraulic pressure Pm detected by the master-cylinder pressure sensor 79 is lower than an assist-need-judgment threshold ThP and the increase rate dPm of the master-cylinder hydraulic pressure is higher than the urgent-operation judgment threshold ThdP, it is regarded that an urgent operation of the brake pedal 10 is carried out and accordingly the assist condition is satisfied.

Pm<ThP dPm>ThdP

In this Embodiment 2, the assist condition includes the requirement that the master-cylinder hydraulic pressure is lower than the assist-need-judgment threshold. This is because, when the master-cylinder hydraulic pressure is high, it is possible to obtain a sufficiently high master-cylinder hydraulic pressure even without execution of the assisting control. The determination as to whether the urgent operation is carried out or not, is made based on only the increase rate of the master-cylinder hydraulic pressure.

Figure 10:
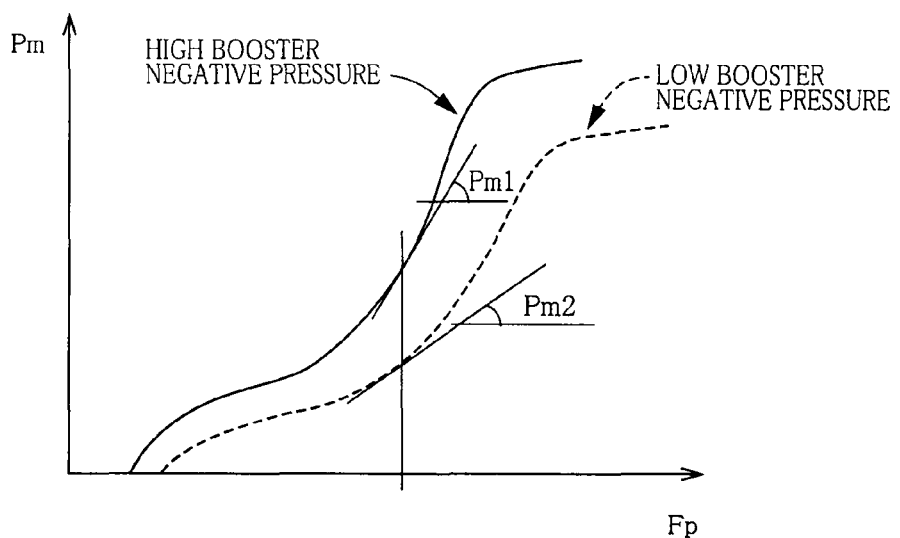
FIG. 10 is a view showing a relationship between a brake operating force and a master-cylinder hydraulic pressure in the braking apparatus braking apparatus that includes the brake control device included in the vehicle control system constructed according to Embodiment 2 of the present invention.

As shown in FIG. 10, the increase rate of the master-cylinder hydraulic pressure is lower when the booster negative pressure is close to the atmospheric pressure than the booster negative pressure is close to the vacuum pressure (dPm1>dPm2), due to a delay of boosting by the booster 12 when the booster negative pressure is close to the atmospheric pressure, even without change of the increase rate of the operating force.

Figure 11:
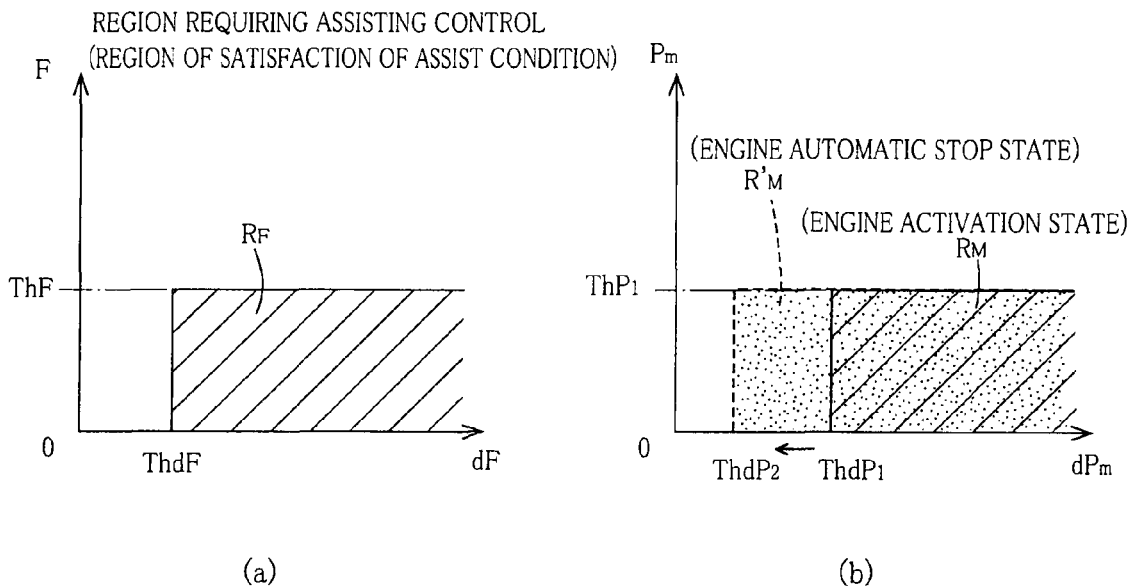
FIG. 11 is a set of views conceptually showing a region requiring the assisting control to be executed by the above-described brake control device.

Consequently, as shown in FIG. 11 (*a*), (*b*), when the booster negative pressure is close to the vacuum pressure, a region $R_F$ and a region $R_M$ correspond to each other, wherein the region $R_F$ (in which it is regarded that the urgent-operation assisting control is required) is determined based on the operating force while the region $R_M$ (in which it is regarded that the urgent-operation assisting control is required) is determined based on the master-cylinder hydraulic pressure represented by the solid line in FIG. 10. When the booster negative pressure is close to the atmospheric pressure, the above-described region $R_F$ and a region $R_{M'}$ correspond to each other, wherein the region $R_{M'}$ (in which it is regarded that the urgent-operation assisting control is required) is determined based on the master-cylinder hydraulic pressure represented by the broken line in FIG. 10. It is noted that the region $R_M$ and the region $R_{M'}$ are the same as each other with respect to the value of the assist-need-judgment threshold.

In this Embodiment 2, during the activation state of the engine 30, the assist-need-judgment threshold ThP and the judgment threshold ThdP regarding the increase rate of the master-cylinder hydraulic pressure are determined based on the region $R_M$ (ThP1, ThdP1) shown in FIG. 11(*b*).

On the other hand, during the automatic stop state of the engine 30, the urgent-operation judgment threshold ThdP regarding the increase rate of the master-cylinder hydraulic pressure is smaller than during the activation state of the engine 30 and is determined depending on the actual booster negative pressure, while the assist-need-judgment threshold ThP is the same as during the activation state of the engine 30.

Figure 12:
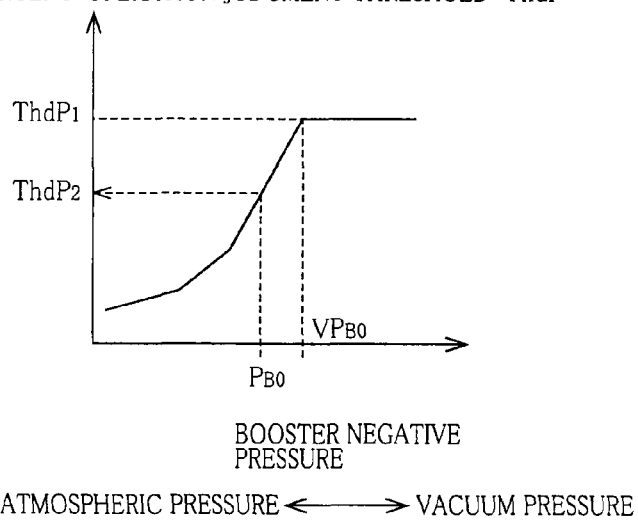
FIG. 12 is a view conceptually showing a threshold determining table stored in the storage portion of the brake ECU of the above-described brake control device.

FIG. 12 shows a relationship between the booster negative pressure and the urgent-operation judgment threshold ThdP, which is prestored in the storage portion. The urgent-operation judgment threshold ThdP is determined, based on the actual booster negative pressure $P_{BO}$ detected by the booster negative-pressure sensor 78, in accordance with the relationship stored in the storage portion.

As shown in FIG. 12, the urgent-operation judgment threshold ThdP is determined to be smaller when the booster negative pressure $P_{BO}$ is close to the atmospheric pressure than when the booster negative pressure $P_{BO}$ is close to the vacuum pressure. Further, even during the automatic stop state of the engine 30, when the booster negative pressure $P_{BO}$ is closer to the vacuum pressure than to a given pressure $VP_{BO}$, the urgent-operation judgment threshold ThdP is set to the same value ThdP1 as during the activation state of the engine 30. This is because, even during the automatic stop state of the engine 30, it is possible to use the same starting condition as during the activation state of the engine 30 as long as the booster negative pressure $P_{BO}$ is close to the vacuum pressure.

Figure 13:
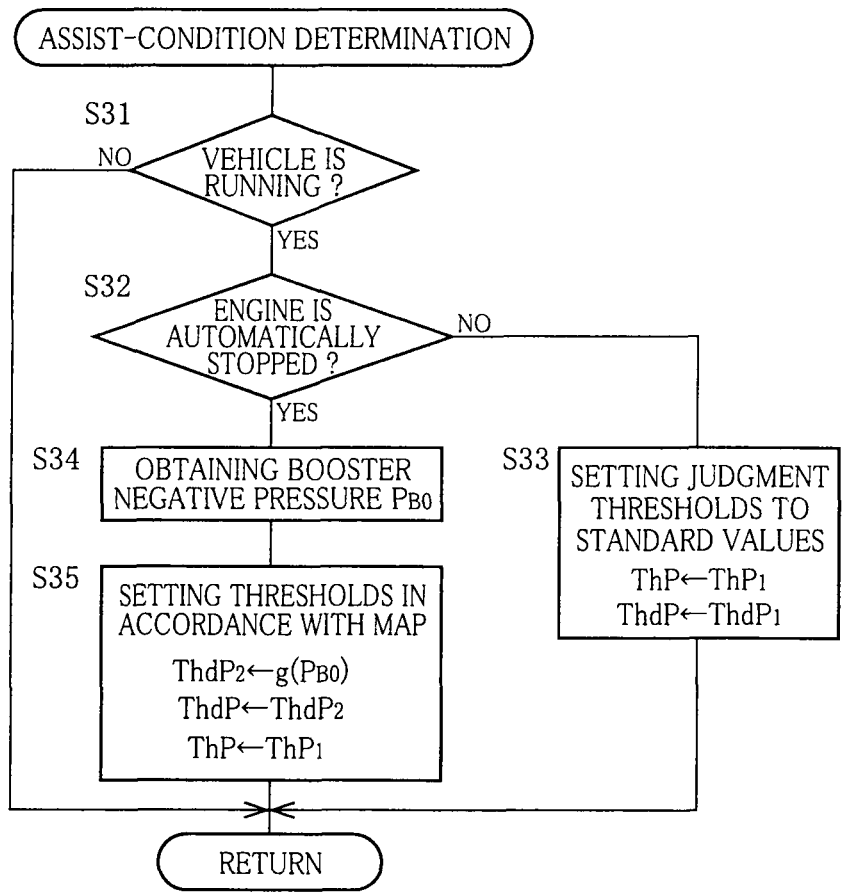
FIG. 13 is a flow chart showing an assist-condition determining program stored in the storage portion of the above-described brake ECU.

An assist-condition determining program represented by a flow chart of FIG. 13 is executed at a predetermined time interval.

The routine in accordance with the assist-condition determining program is initiated with step S31 that is implemented to judge whether the vehicle is running or not. When the vehicle is running, step S32 is implemented to judge whether the engine 30 is being placed in the automatic stop state or not. When the engine 30 is being placed in the activation state, a negative judgment (NO) is obtained in step S32 whereby the control flow goes to step S33 in which the assist-need-judgment threshold ThP and the urgent-operation judgment threshold ThdP are set to the respective standard values ThP1, ThdP1.

ThP←ThP1
ThdP←ThdP1

On the other hand, when the engine 30 is being placed in the automatic stop state, step S34 is implemented to read a value detected by the booster negative-pressure sensor 78. Step S34 is followed by step S35 in which the urgent-operation judgment threshold ThdP2 is determined, based on the actual booster negative pressure $P_{BO}$, in accordance with the table represented by the map of FIG. 12, while the assist-need-judgment threshold ThP is set to the standard value ThP1.

(ThP←ThP1)
ThdP←ThdP2

The thresholds determined as described above are compared with the actual master-cylinder hydraulic pressure and the increase rate of the master-cylinder hydraulic pressure in step S2 of the brake assisting control. In this step S2, when the master-cylinder hydraulic pressure Pm is smaller than the assist-need-judgment threshold ThP and the increase rate dPm is larger than the urgent-operation judgment threshold ThdP, it is regarded that the assist condition is satisfied, whereby step S3 is implemented to start the assisting control.

In this Embodiment 2, too, the urgent-operation judgment threshold ThdP regarding the increase rate of the master-cylinder hydraulic pressure is set to be smaller when the booster negative pressure is close to the atmospheric pressure than when the booster negative pressure is close to the vacuum pressure, so that the assisting control can be executed, for example, at the same point of time, in response to the same urgent operation, irrespective of whether the booster negative pressure is high or low.

Further, during the automatic stop state of the engine 30, the urgent-operation judgment threshold is determined based on the detected value of the actual booster negative pressure, so that the urgent-operation judgment threshold is reduced only when the reduction of the urgent-operation judgment threshold is really required. Consequently, during the automatic stop state of the engine 30, the assisting control can be started only when the execution of the assisting control is really required, thereby making it possible to reduce consumption of the electric power.

Further, during the automatic stop state of the engine 30, the assist-need-judgment threshold is set to the same standard value as during the activation state of the engine 30. Therefore, during the automatic stop state of the engine, the assisting control can be started even with the operating force applied to the brake operating member being larger, as compared with during the activation state of the engine. Consequently, it is possible to reduce the braking force insufficiency that is caused in the situation in which the master-cylinder hydraulic pressure is made low due to delay of boosting by the booster 12.

As described above, in Embodiment 2, the automatic-stop assisting control portion is constituted by, for example, portions of the urgent-operation assisting control portion which are assigned to execute and store steps S2 and S3 of the urgent-operation assisting control. The automatic-stop assisting control portion serves also as a braking-force-insufficiency assisting control portion. Further, the starting-condition determining portion is constituted by, for example, a potion of the brake ECU 24 which is assigned to determine the urgent-operation judgment threshold ThdP in steps S34 and S35 of the assist-condition determining program represented by the flow chart of FIG. 13, a portion of the brake ECU 24 which is assigned to store the portion of the ECU 24 assigned to determine the urgent-operation judgment threshold ThdP, and a portion of the brake ECU 24 which is assigned to store the table represented by the map of FIG. 12. The starting-condition determining portion serves also as the urgent-operation judgment threshold determining portion, a variable-threshold determining portion and a limited-case-reduced-threshold determining portion. The urgent-operation judgment threshold determining portion serves also as a variable assist-need-judgment threshold determining portion.

It is noted that the assist-need-judgment threshold used during the automatic stop state of the engine 30 may be set to a value that is larger than the standard value ThP1 by a given value $\Delta P$ (ThP←ThP1+$\Delta P$). The given value $\Delta P$ may be either a fixed value or a variable value that is made larger when the booster negative pressure is close to the vacuum pressure than when the booster negative pressure is close to the atmospheric pressure. Further, the assist-need-judgment threshold may be set to a value which is larger than the standard value and which is made larger when the booster negative pressure is close to the vacuum pressure than when the booster negative pressure is close to the atmospheric pressure. In any of these cases, it is possible to cause a region in which the assisting control is carried out, to be further wider, and accordingly to satisfactorily reduce the braking force insufficiency due to delay of boosting by the booster 12.

Further, the urgent-operation judgment threshold ThdP may be also a value that varies, in a stepped manner, depending on the booster negative pressure $P_{BO}$.

Moreover, the booster negative pressure may be obtained as a value that is estimated based on the operational state of the engine 30. That is, the booster negative pressure can be estimated based on, for example, the throttle opening degree, the engine rotational speed, the pressure within the intake manifold 32 or sequential change of any of these values. The use of the estimated value of the booster negative pressure eliminates necessity of the provision of the booster negative-pressure sensor 78 and accordingly makes it possible to reduce the cost by the elimination.

Further, as a part of the assisting control, the braking force may be increased after the booster 12 has reached the boosting limit, such that the relationship between the operating force and the master-cylinder hydraulic pressure is not changed between before and after the booster 12 has reached the boosting limit. In this arrangement, a threshold used for determination as to whether or the booster 12 has reached the boosting limit, may be smaller during the automatic stop state of the engine 30 than during the activation state of the engine 30.

Moreover, the above-described Embodiments 1 and 2 may be suitably combined to each other so that the suitable combination of the Embodiments 1 and 2 can be carried out, for example. The present invention can be carried out according to not only the above-described modes but also in other modes of various modifications and improvements that will be made based on knowledge of a person skilled in the art.

DESCRIPTION OF REFERENCE SIGNS

2: brake control device 4: engine control device 10: brake pedal 12: vacuum booster 14: master cylinder 20: brake hydraulic-pressure control unit 24: brake ECU 30: engine 44: engine ECU 46: CAN 60: pressurizing piston 61: pressurized chamber 68: negative-pressure chamber 78: booster negative pressure sensor 79: master-cylinder pressure sensor 110: pressure control valve 92: pump

The invention claimed is:

1. A vehicle control system for a vehicle, comprising:

an engine control device configured to automatically stop an engine of the vehicle during running of the vehicle; and a brake control device configured to execute an assisting control for increasing an output of a brake for restraining rotation of a wheel of the vehicle when a starting condition for starting the assisting control is satisfied, such that an amount of the output increased by execution of the assisting control becomes larger, by an assist amount, than an amount corresponding to an operational state of a brake operating member of the vehicle, wherein said brake control device includes an automatic-stop assisting control portion that is configured to execute the assisting control during an automatic stop state in which the engine is being automatically stopped by the engine control device, wherein the starting condition to be satisfied for execution of the assisting control during the automatic stop state by said automatic-stop assisting control portion is different from the starting condition to be satisfied for execution of the assisting control during an activation state of the engine, wherein said vehicle control system is to be provided in the vehicle including (a) a vacuum booster configured to boost an operating force applied to the brake operating member, owing to a pressure difference between a negative pressure chamber and a variable pressure chamber of the vacuum booster, and configured to output the boosted operating force, (b) a master cylinder configured to cause a pressurizing piston of the master cylinder to be moved forwardly by the boosted operating force outputted by the vacuum booster, so as to generate a hydraulic pressure in a pressurized chamber located on a front side of the pressurizing piston, and (c) a negative-pressure supplying mechanism configured to supply a negative pressure to the negative chamber of the vacuum booster, owing to activation of the engine, wherein said brake control device includes an urgent-operation assisting control portion configured to regard that the starting condition is satisfied when at least one of a hydraulic-pressure-related value and an increase rate of the hydraulic-pressure-related value is larger than an urgent-operation judgment threshold regarding said at least one of the hydraulic-pressure-related value and the increase rate of the hydraulic-pressure-related value, and configured to start the assisting control when regarding that the starting condition is satisfied, the hydraulic-pressure-related value being constituted by at least one of the hydraulic pressure in the master cylinder and a physical value having a one-to-one relationship with the hydraulic pressure in the master cylinder, wherein said automatic-stop assisting control portion includes a starting-condition determining portion configured to determine the starting condition that is to be satisfied during the automatic stop state of the engine, such that the determined starting condition during the automatic stop state is satisfiable easier than the starting condition during the activation state of the engine, and wherein said starting-condition determining portion includes an urgent-operation judgment-threshold determining portion configured to determine the urgent-operation judgment threshold that is to be used during the automatic stop state of the engine such that the determined urgent-operation judgment threshold used during the automatic stop state is smaller than the urgent-operation judgment threshold used during the activation state of the engine.

2. The vehicle control system according to claim 1, wherein said urgent-operation judgment-threshold determining portion includes a fixed-threshold determining portion configured to determine a predetermined fixed value as the urgent-operation judgment threshold that is to be used during the automatic stop state of the engine.

3. The vehicle control system according to claim 1, wherein said urgent-operation judgment-threshold determining portion includes a variable-threshold determining portion configured to determine a variable value as the urgent-operation judgment threshold that is to be used during the automatic stop state of the engine, such that the determined urgent-operation judgment threshold used during the automatic stop state is smaller when a pressure in the negative pressure chamber of the vacuum booster is close to an atmospheric pressure than when the pressure in the negative pressure chamber of the vacuum booster is close to a vacuum pressure.

4. The vehicle control system according to claim 1, wherein said urgent-operation judgment-threshold determining portion includes a limited-case-reduced-threshold determining portion configured to determine a limited-case-reduced value as the urgent-operation judgment threshold that is to be used during the automatic stop state of the engine, such that the determined urgent-operation judgment threshold used during the automatic stop state is smaller when a pressure in the negative pressure chamber of the vacuum booster is closer to an atmospheric pressure than to a vacuum-pressure-shortage-judgment threshold, than the urgent-operation judgment threshold used during the activation state of the engine.

5. The vehicle control system according to claim 1, wherein said urgent-operation assisting control portion includes a portion configured to regard that the starting condition is satisfied when the hydraulic-pressure-related value and the increase rate of the hydraulic-pressure-related value are larger than the respective urgent-operation judgment thresholds regarding the hydraulic-pressure-related value and the increase rate of the hydraulic-pressure-related value, and configured to start the assisting control when regarding that the starting condition is satisfied.

6. The vehicle control system according to claim 1,
wherein said urgent-operation assisting control portion includes a braking-force-insufficiency assisting control portion configured to regard that the starting condition is satisfied when the increase rate of the hydraulic-pressure-related value is larger than the urgent-operation judgment threshold regarding the increase rate of the hydraulic-pressure-related value and the hydraulic-pressure-related value is smaller than an assist-need-judgment threshold, and configured to start the assisting control when regarding that the starting condition is satisfied,
and wherein said starting-condition determining portion includes a portion which is configured to determine the urgent-operation judgment threshold such that the determined urgent-operation judgment threshold is smaller during the automatic stop state of the engine than during the activation state of the engine, and a portion which is configured to determine the assist-need-judgment threshold such that the determined assist-need-judgment threshold is not smaller during the automatic stop state of the engine than during the activation state of the engine.

* * * * *